(12) United States Patent
Cianciotto et al.

(10) Patent No.: US 7,603,017 B2
(45) Date of Patent: Oct. 13, 2009

(54) MULTI-COLOR CURVED MULTI-LIGHT GENERATING APPARATUS

(75) Inventors: Frank T Cianciotto, Tehachapi, CA (US); George H Butler, III, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/186,030

(22) Filed: Aug. 5, 2008

(65) Prior Publication Data

US 2008/0292259 A1 Nov. 27, 2008

Related U.S. Application Data

(63) Continuation-in-part of application No. 11/830,706, filed on Jul. 30, 2007, now Pat. No. 7,443,591, which is a continuation-in-part of application No. 11/670,320, filed on Feb. 1, 2007, now Pat. No. 7,386,214.

(51) Int. Cl.
G02B 6/00 (2006.01)
(52) U.S. Cl. .......................... 385/133; 385/15; 385/27; 385/31; 385/32; 385/39; 385/45
(58) Field of Classification Search .................. None
See application file for complete search history.

(56) References Cited

U.S. PATENT DOCUMENTS

| | | |
|---|---|---|
| 3,363,668 A | 1/1968 | Petit et al. |
| 3,447,587 A | 6/1969 | Bodine, Jr. |
| 3,678,988 A | 7/1972 | Tien et al. |
| 3,825,741 A | 7/1974 | Morton et al. |
| 4,373,950 A | 2/1983 | Shingu et al. |
| 4,582,117 A | 4/1986 | Kushnick |
| 4,632,513 A | 12/1986 | Stowe |
| 4,964,692 A | 10/1990 | Prescott |
| 5,054,869 A | 10/1991 | Doyle |
| 5,054,874 A | 10/1991 | Hill |
| 5,148,853 A | 9/1992 | Yu et al. |
| 5,305,817 A | 4/1994 | Borisov et al. |

(Continued)

FOREIGN PATENT DOCUMENTS

JP 11-017969 1/1999

(Continued)

OTHER PUBLICATIONS

U.S. Appl. No. 11/830,706, filed Jul. 30, 2007, Cianciotto.

Primary Examiner—Uyen Chau N Le
Assistant Examiner—Chad H Smith
(74) Attorney, Agent, or Firm—Haynes and Boone, LLP.

(57) ABSTRACT

In accordance with one or more embodiments of the present disclosure, a multi-color curved multi-light generating apparatus comprises a first input component adapted to receive a first input light beam, a second input component adapted to receive a second input light beam, a third input component adapted to receive a third input light beam, and an output component adapted to provide an output light beam. The input components and the output component are joined together to combine the input light beams and form the output light beam. In various implementations, each of the input components and the output component comprise a hollow tube with a polygonal cross-section, such as a hexagonal cross-section.

25 Claims, 17 Drawing Sheets

U.S. PATENT DOCUMENTS

| | | | |
|---|---|---|---|
| 5,375,185 A | 12/1994 | Hermsen | |
| 5,553,183 A | 9/1996 | Bechamps | |
| 5,604,837 A | 2/1997 | Tanaka | |
| 5,610,733 A | 3/1997 | Feldman et al. | |
| 5,701,191 A | 12/1997 | Iwasaki | |
| 5,727,108 A | 3/1998 | Hed | |
| 5,803,575 A | 9/1998 | Ansems et al. | |
| 5,812,713 A | 9/1998 | Allen et al. | |
| 5,828,505 A | 10/1998 | Farmiga | |
| 6,038,361 A | 3/2000 | Yoshikawa et al. | |
| 6,104,857 A | 8/2000 | Ishiharadsa et al. | |
| 6,123,436 A | 9/2000 | Hough et al. | |
| 6,125,228 A | 9/2000 | Gong | |
| 6,149,289 A | 11/2000 | Kuramitsu et al. | |
| 6,324,330 B1 | 11/2001 | Stites | |
| 6,332,688 B1 | 12/2001 | Magarill | |
| 6,366,308 B1 | 4/2002 | Hawryluk et al. | |
| 6,385,371 B1 * | 5/2002 | Li | 385/43 |
| 6,513,937 B1 * | 2/2003 | Dehmlow | 353/94 |
| 6,595,673 B1 | 7/2003 | Ferrante et al. | |
| 6,771,870 B2 | 8/2004 | Strobl et al. | |
| 6,792,190 B2 | 9/2004 | Xin et al. | |
| 6,801,701 B1 | 10/2004 | Montgomery et al. | |
| 6,857,764 B2 | 2/2005 | Kohno | |
| 6,986,591 B2 | 1/2006 | Pate | |
| 7,113,684 B1 | 9/2006 | Cianciotto et al. | |
| 7,155,106 B2 | 12/2006 | Cianciotto et al. | |
| 7,171,097 B2 | 1/2007 | Cianciotto et al. | |
| 7,173,775 B2 | 2/2007 | Cianciotto et al. | |
| 7,182,495 B2 | 2/2007 | Cianciotto et al. | |
| 7,265,906 B2 | 9/2007 | Cianciotto et al. | |
| 7,295,385 B2 | 11/2007 | Cianciotto et al. | |
| 7,324,731 B2 | 1/2008 | Cianciotto | |
| 7,386,214 B1 | 6/2008 | Cianciotto | |
| 7,414,793 B2 | 8/2008 | Cianciotto | |
| 2001/0005222 A1 | 6/2001 | Yamaguchi | |
| 2003/0063884 A1 * | 4/2003 | Smith et al. | 385/129 |
| 2004/0137089 A1 | 7/2004 | Dinan | |
| 2004/0137189 A1 | 7/2004 | Tellini et al. | |
| 2005/0084210 A1 | 4/2005 | Cha | |
| 2005/0112639 A1 | 5/2005 | Wang et al. | |
| 2005/0135766 A1 * | 6/2005 | Cianciotto et al. | 385/133 |
| 2005/0162853 A1 | 7/2005 | Jain | |
| 2005/0237621 A1 | 10/2005 | Peterson | |
| 2005/0270652 A1 | 12/2005 | Voss et al. | |
| 2006/0256445 A1 | 11/2006 | Zueger | |
| 2006/0256449 A1 | 11/2006 | Cianciotto et al. | |

FOREIGN PATENT DOCUMENTS

| | | |
|---|---|---|
| JP | 11-250227 | 9/1999 |

* cited by examiner

MULTI-COLOR CURVED MULTI-LIGHT GENERATING APPARATUS

CROSS-REFERENCE TO RELATED APPLICATIONS

This continuation-in-part patent application is related to and claims priority to U.S. patent application Ser. No. 11/830,706, filed Jul. 30, 2007, which is a continuation-in-part patent application related to U.S. Pat. No. 7,386,214, filed Feb. 1, 2007, each of which are incorporated herein by reference in their entirety.

TECHNICAL FIELD

The present disclosure relates generally to optical guides, and more particularly, to a multi-color curved multi-light generating apparatus.

BACKGROUND

Optical devices that combine or homogenize an incoming light beam are known, yet such devices typically include heavy, expensive, and delicate components that may limit the application of these useful techniques. Previous attempts have included the use of a hex-shaped glass rod with an exterior cladding configured to provide reflection of light within the glass rod. Such a glass rod is typically very expensive to produce, extremely fragile, and has the disadvantage that light may leak out of the glass rod if the exterior cladding is damaged. When an input beam is non-uniform, additional components are typically required to produce a uniform intensity distribution. Such additional components contribute to the increased cost, weight, and complexity of the optical system since these additional components may be subject to misalignment or may be more susceptible to optical contamination.

Unfortunately, the use of multiple optical elements may lead to substantial intensity losses as a light beam propagates through the multiple optical elements. Thus, there remains a need for an apparatus and method to provide light combining and homogenization in a rugged, compact, and low cost manner.

SUMMARY

In accordance with one or more embodiments of the present disclosure, systems and methods disclosed herein provide a multi-color curved multi-light generating apparatus (e.g., a tri-light generating apparatus) having at least two or three curved input legs that merge into a mixing chamber with a single output leg, and each of the legs comprises a hollow multi-sided shape (e.g., hexagonal shape) having highly polished reflective interior surfaces that allow for uniform mixing. In one implementation, a plurality of individual, distinct colors, and/or wavelengths may be combined to form a single colored output beam. As such, a plurality of separate colors and/or wavelengths of light may be inputted and combined to form an output result having a single wavelength of a highly uniform colored beam. This is achieved with the principle of optical reflection.

In accordance with an embodiment of the present disclosure, a multi-color curved tri-light generating apparatus comprises three input legs and one output leg. Three different color light sources may be supplied into the input legs, with one color per leg. The light beams travel down each input leg and are transformed into a highly homogenized beam at the junction (i.e., mixing chamber) of the three input legs. In one aspect, the three separate light beams mix together and produce a new colored light source with an intensity equal to approximately the sum of the intensities of the original three light beams. The new colored, higher intensity light source travels down the output leg for homogenizing, and then exits the output leg as a highly uniform light source. The mixing and production of the new output light beam is accomplished with optical reflection, which provides improved efficiency (e.g., >96%) and reliability.

In accordance with an embodiment of the present disclosure, a plurality of the tri-light generating apparatuses may be configured to form an interlocking array. In one implementation, a single light source may be adapted to supply each leg of multiple units.

In accordance with an embodiment of the present disclosure, an apparatus for combining a plurality of light beams comprises a first input component adapted to receive a first input light beam, a second input component adapted to receive a second input light beam, a third input component adapted to receive a third input light beam, and an output component adapted to provide an output light beam. The input components and the output component are joined together to combine the input light beams and form the output light beam.

In various implementations, each of the input components and the output component comprise a hollow tube with a polygonal cross-section (e.g., a hexagonal cross-section) and reflective interior surfaces. The reflective interior surfaces are adapted to reflect the input light beams to homogenize the input light beams into a single output light beam. In one aspect, the input components and the output component are joined together to form a one-piece body having a structure with a plurality of curved tubular legs corresponding to the first, second, and third input components, and each of the legs are joined at a junction with the output component comprising an output leg extending from the junction.

In accordance with an embodiment of the present disclosure, a method for combining a plurality of light beams comprises receiving a first input light beam having a first wavelength, receiving a second input light beam having a second wavelength, receiving a third input light beam having a third wavelength, reflecting each of the input light beams, and combing the input light beams into a single output light beam having a fourth wavelength that is a combination of the wavelengths of the input light beams.

In various implementations, the method may further comprise blending the first, second and third wavelengths into the fourth wavelength, and reflecting the input light beams comprises homogenizing the input light beams. Also, the first wavelength may comprise the wavelength for the color red, and the second wavelength may comprise the wavelength for the color blue, and the third wavelength may comprise the wavelength for the color green.

The scope of the present disclosure is defined by the claims, which are incorporated into this section by reference. A more complete understanding of embodiments will be afforded to those skilled in the art, as well as a realization of additional advantages thereof, by a consideration of the following detailed description. Reference will be made to the appended sheets of drawings that will first be described briefly.

BRIEF DESCRIPTION OF THE DRAWINGS

Embodiments and their advantages are best understood by referring to the detailed description that follows. It should be appreciated that like reference numerals are used to identify like elements illustrated in one or more of the figures.

DETAILED DESCRIPTION

In accordance with one or more embodiments of the present disclosure, systems and methods disclosed herein provide a multi-color curved tri-light generating apparatus having, in various implementations, two or three curved input legs merging into a mixing chamber with a single output leg, wherein each of the legs comprises a hollow six-sided hex-structure having highly polished reflective interior surfaces that allow for uniform mixing, combining, and/or homogenizing. Accordingly, in various examples, up to three separate colors may be mixed, combined, and/or homogenized to produce an output result in a single wavelength.

Figure 1:
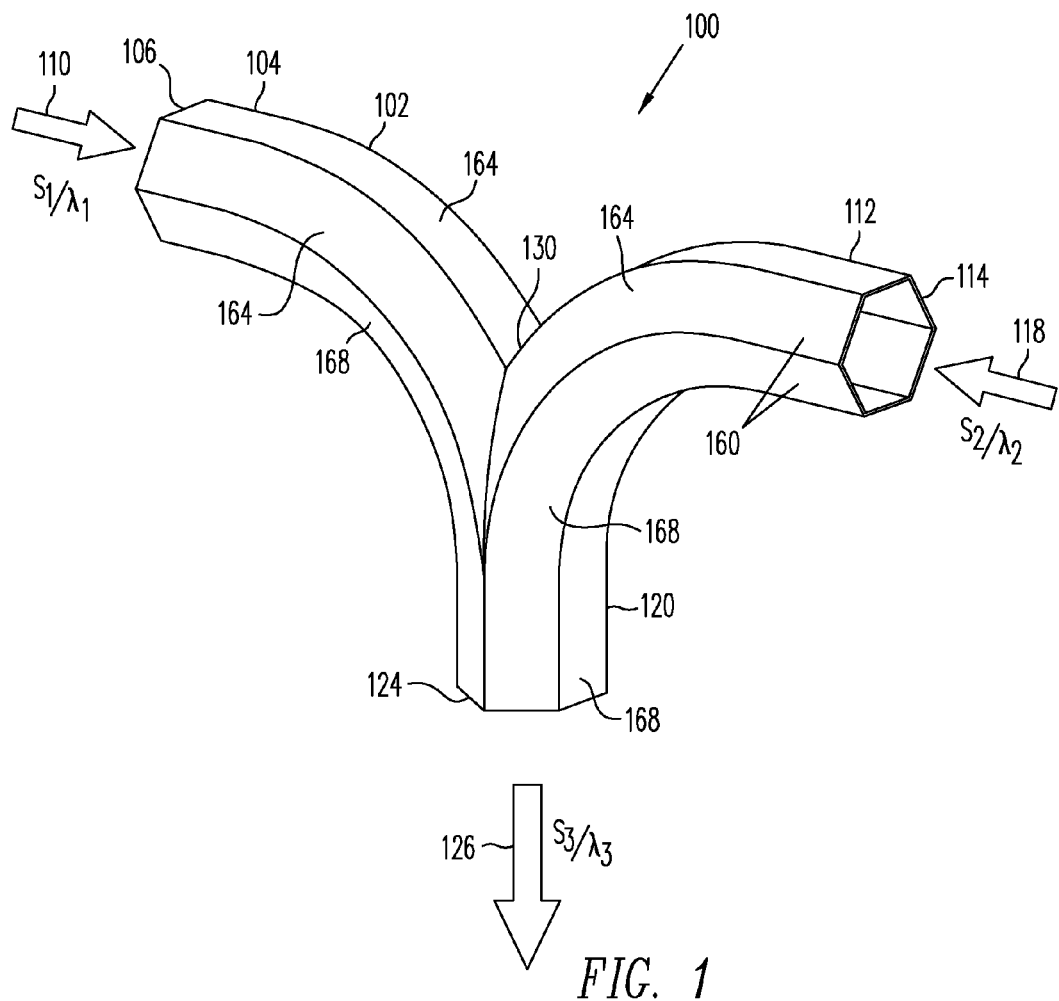
FIG. 1 illustrates a light homogenizing and combining apparatus, in accordance with an embodiment of the present disclosure.

FIG. 1 illustrates a side view of a light homogenizing and combining apparatus (LHCA) 100, in accordance with an embodiment of the present disclosure. LHCA 100 may comprise a one-piece, closed, hollow tubular member, or tubular body 102 having legs 104, 112 and 120. Each leg 104, 112 and 120 may have a polygonal cross-section, for example hexagonal, and have highly reflective interior surfaces.

The body 102 may include a first leg 104 or first input leg having an opening 106 configured to receive a first Gaussian light beam 110 of a first intensity and spectral content $S_1$ or color $\lambda_1$. The light beam 10 is reflected within first leg 104 to provide a first leg output beam 110' (FIG. 4) that is at least partially homogenized.

Similarly, body 102 may also include a second leg 112, or second input leg, having an opening 114 configured to receive a second Gaussian light beam 118 of a second intensity and spectral content $S_2$ or color $\lambda_2$. Light beam 118 may be reflected within second leg 112 to produce a second leg output beam 118' that is at least partially homogenized. While two input legs are shown, this is not considered limiting.

Body 102 may also include a third leg 120, or output leg with an output opening 124. The input legs 104, 112 and the output leg 120 are joined so that substantially all of the energy of the first leg output beam 110' (FIG. 4) and the second leg output beam 118' (FIG. 4) combine at a junction 130, reflect within the third leg 120, resulting in a third leg output beam 126 emitted from the third leg second end 124.

The third leg output beam 126 may have a third intensity and spectral content $S_3$ or color $\lambda_3$ that is a combination of the first intensity and spectral content $S_1$ and the second intensity and spectral content $S_2$. The third leg output beam 126 may have a homogenized top hat profile. In one alternative, a third leg output beam from a first LHCA 100 may be applied as an input beam to a second LHCA 100, so that three or more Gaussian light beams may be combined in a sequential or serial manner.

While the LHCA 100 may have a hexagonal cross-section, other geometrical cross-sections may also be used including triangular, square, pentagonal, heptagonal, and octagonal, for example. Further, first leg 104, second leg 112, and third leg 120 may each have the same or a different geometrical cross-sections.

In the present disclosure, the color of light refers to the wavelength or frequency distribution, band, or spectral content of the light and may include both visible and invisible wavelengths. While a particular spectra or wavelength is described for each beam, it is understood that the color of a beam refers equally to its frequency components and associated intensity for each component, and may also be referred to as frequency profile, spectral content, or spectral power distribution (SPD) for the associated beam.

In an example embodiment, the LHCA 100 has a shape corresponding to truncated, bent tubes joined along a junction to define an enclosed LCHA. The bent tubes may have a polygonal cross-section, for example hexagonal. The tubes may be truncated along a plane parallel with the axis 144 (FIG. 2) of the output leg 124. The tubes are truncated such that the edges of one of the bent tubes along the plane of truncation match up with the edges of the other bent tube along the corresponding plane of truncation so that the two truncated, bent tube shapes form a closed LCHA with multiple input openings 106, 112 and an output opening 124 when joined.

The LCHA 100 may include a plurality of side members 160. The side members may include junction side panels 164 and continuous side panels. The junction panels 164 have junction edges 165 that all lie in a common plane. The plane is parallel to the axis 144 of the output leg 120. The joined junction edges 165 define the junction 130.

First ends of some of the continuous panels 168 together with first ends of some of the junction panels 164 to define the first input tube 104 and the first input opening 106. First ends of other continuous panels 168 together with first ends of other junction panels 164 define the second input leg 112 and the second input opening 114. Second ends of all of the continuous panels 168 may be joined together to define the output leg 120 and output opening 124.

Figure 2:
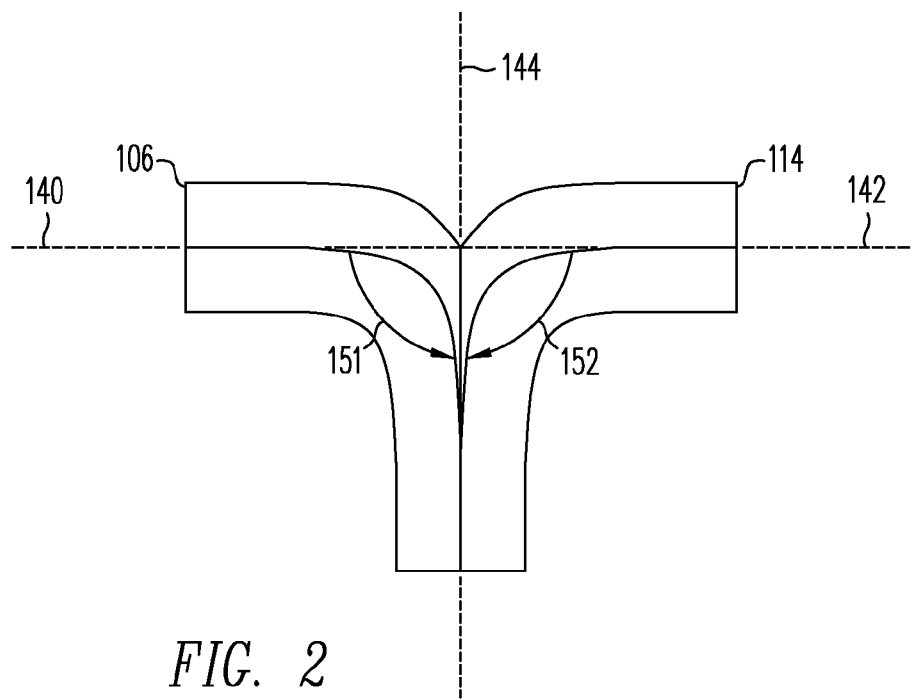
FIG. 2 illustrates a side view of the light homogenizing and combining apparatus of FIG. 1.

FIG. 2 illustrates a side view of the LHCA 100 of FIG. 1. The opening 106 may be arranged along a central, longitudinal axis 140 normal or perpendicular to the planar cross-section of the opening 106. The opening 114 may be arranged along a central, longitudinal axis 142. The second end 124 of the third leg 120 may be arranged along a central, longitudinal axis 144. The axes 140, 142 may be arranged at angles 151, 152 with respect to the axis 144.

In one embodiment, the angles 151, 152 may be the same angles. In other embodiments, the axes 140, 142 may be at different angles with respect to the axis 144. The angles 151, 152 may be, for example, right angles. In other embodiments, the central, longitudinal axes 140, 142 may be arranged at angles 151, 152 from 90 degrees to 180 degrees up to right angles with respect to the central, longitudinal axis 144.

Figure 1A:
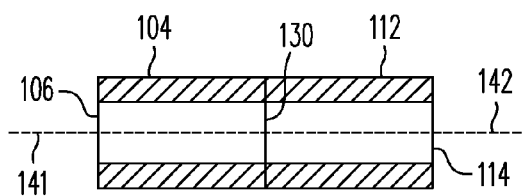
FIG. 1A illustrates an overhead view of the light homogenizing and combining apparatus of FIG. 1.
Figure 3:
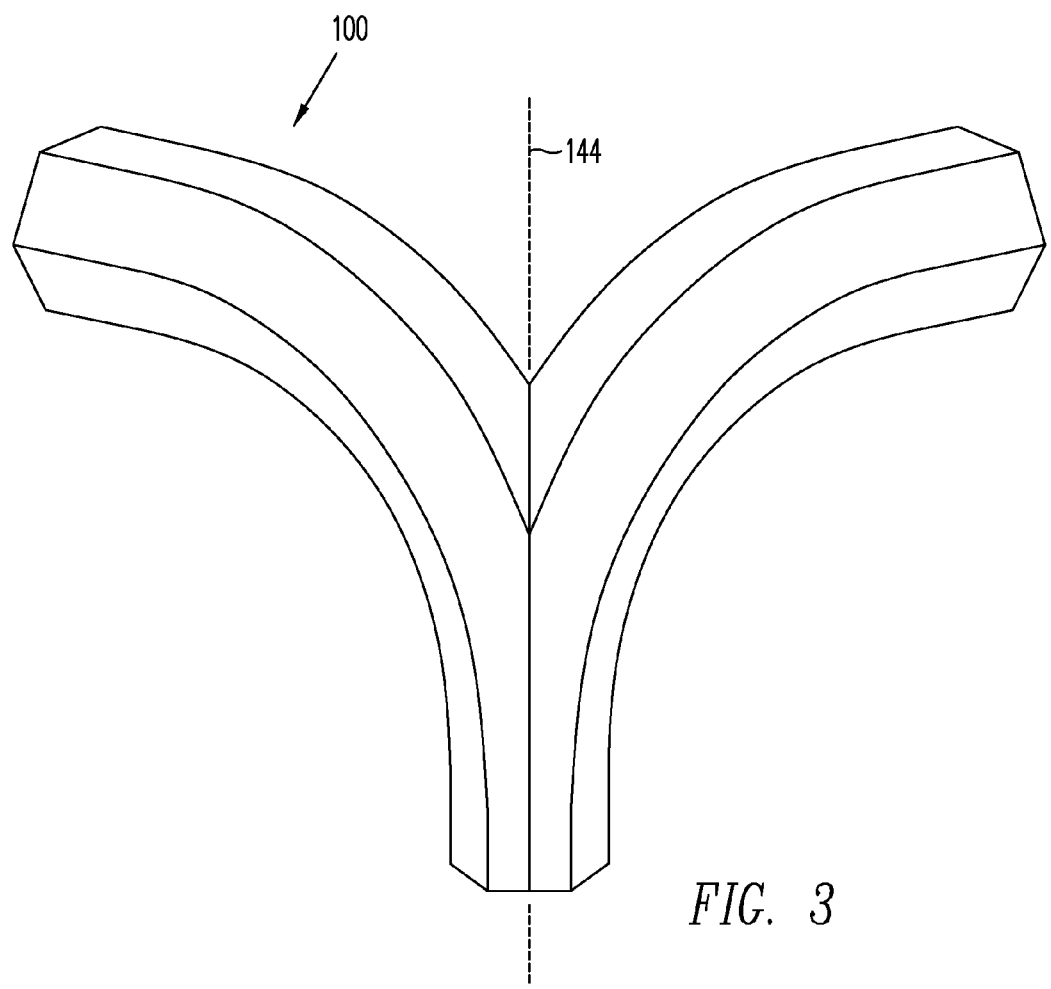
FIG. 3 illustrates a light homogenizing and combining apparatus in accordance with an embodiment of the present disclosure.

In one embodiment, the axes 140, 142 may be parallel and co-linear when viewed from a perspective normal to the axis 144, as shown, for example in FIG. 1a. In other embodiments, the axes 140, 142 may be arranged with an angle 145 from zero to 180 degrees between the axes 140, 142 when viewed from a perspective normal to the axis 144, for example 120 degrees, as shown for example in FIGS. 3 and 3b.

Figure 4:
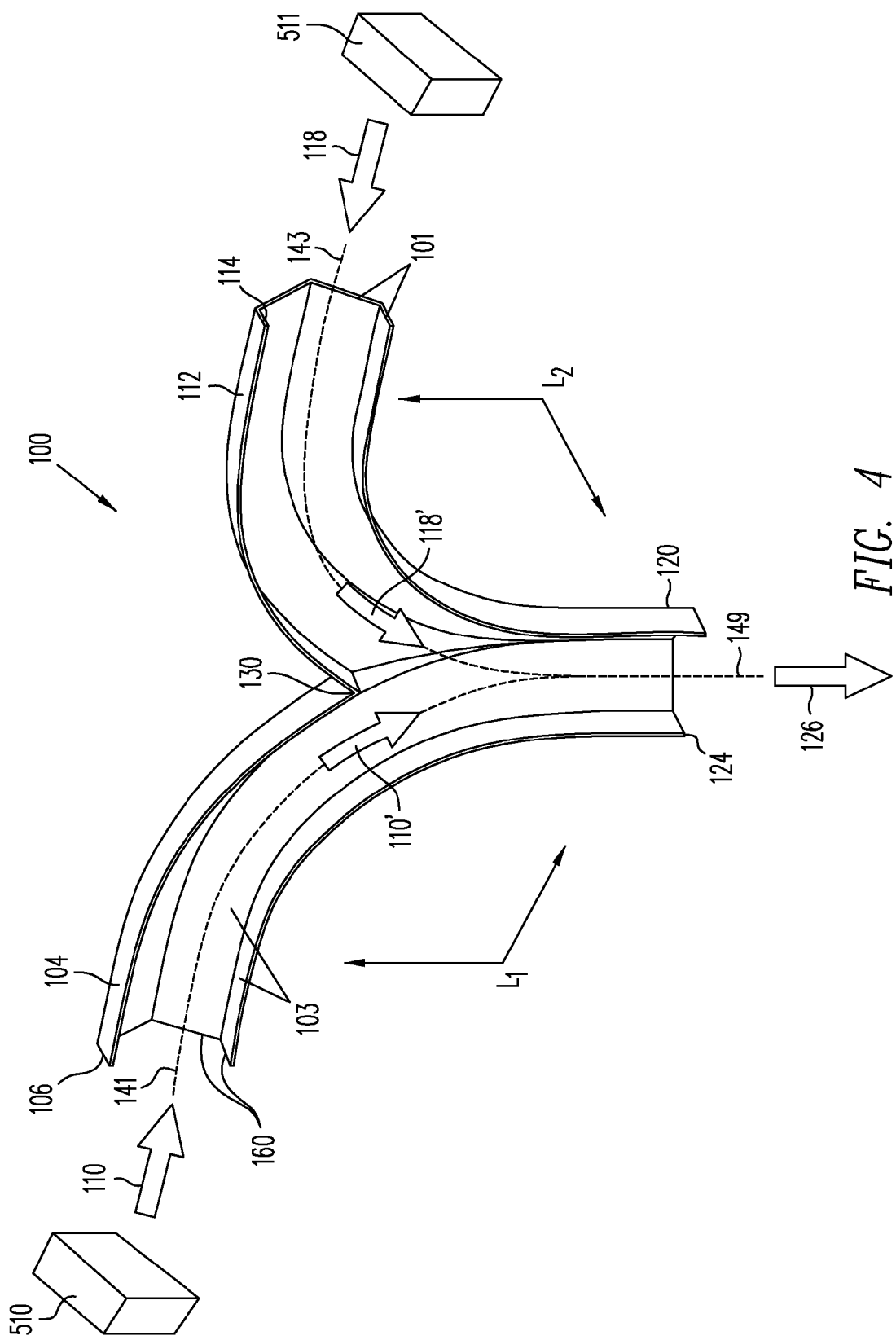
FIG. 4 illustrates an open, cross-sectional view of the light homogenizing and combining apparatus of FIG. 1.

FIG. 4 illustrates a view of an open cross-section of the LCHA 100 of FIG. 1. The tubular leg portions 104, 112 and 120 of body 102 may have polygonal cross-section shapes. They may also each have a plurality of side members 160 having highly reflective interior surfaces 103, so that light beams reflecting off an interior surface of these planar side members are reflected or folded over at least five times.

First input leg 104 and output leg 120 define a curved shape for which the geometric center of the polygonal cross-section of the curved shape defines a curve 141. Second leg 112 and third leg 120 define a curved shape, where the geometric center of the curved shape defines a curve 143. The curves 141 and 143 merge into the same curve 149 at some point before or at the opening 124.

In an example embodiment, there is a distance L1 along the curve 141 from the opening 106 to the opening 124 and a distance L2 along the curve 143 from the opening 114 to the opening 124. The distances L1 and L2 may be sufficiently long to permit incoming light beams 110, 118 to reflect off the interior surfaces 103 of the side members 160 and be reflected or folded over at least five times before exiting the opening 124 as output beam 126.

In another embodiment, the distances L1 and L2 may be sufficiently long to permit the incoming light beams 110, 118 to reflect off an interior surface of the side members and be reflected or folded over at least five times, or be nearly completely homogenized, before being combined with each other and to permit the combined light beams to reflect off the interior surfaces of side members of the output leg and be reflected or folded over at least five times again before exiting as output beam 126.

In an example embodiment, the first and second input beams 110, 118 may have non-homogenized intensity profiles, for example Gaussian profiles. First input leg 104 may be configured to receive and reflect the first input light beam 110 to produce at least a partially homogenized beam 110' within the first leg 104 as first input light beam 110 is reflected by the highly reflective interior surfaces 103 of leg 104. Similarly, second input leg 112 may be configured to receive and reflect the second input light beam 118 to produce at least a partially homogenized input beam 118' within the second leg 112.

The first and second leg output beams 110' and 118' may be combined at a junction portion 130 of the LHCA 100. The combined, at least partially homogenized beams 110' and 118' may reflect on the highly reflective interior surfaces 103 of the second leg. The third leg 120 may provide an output beam 126 which may be a new single homogenized output beam 126. The intensity or amplitude of the output beam may be the sum of the plurality of input beams minus a negligible loss of about 5%. In addition, if the wavelengths (color) of the plurality of input beams are different from each other, then the output beam will have a new, derivative wavelength (color) so LHCA 100 may function as a wavelength blender. In this manner, LHCA 100 performs at least two functions that traditionally may require a minimum of three separate optical components. Therefore, LHCA 100 may provide homogenization and optical combining operations in a more compact, lower weight, and rugged manner while eliminating alignment requirements.

As used in the present disclosure, homogenization includes a process of reflecting light off highly reflective interior surfaces of body 102 a minimum of five times in order to produce an output beam having a top hat profile. In one example, homogenization includes converting a smaller diameter light beam with a Gaussian intensity distribution into a larger diameter light beam with a top hat intensity distribution.

The term Gaussian, or the phrase Gaussian distribution, refers generally to a normal or bell-shaped spatial intensity distribution characterized by a location of higher intensity near the center of a region or cross-section that may fall off uniformly towards the sides of the region. In this case, the mode of the Gaussian curve corresponds to the center part of the input light beam. The phrase top hat, or top hat distribution, refers to a substantially equal spatial intensity distribution along the region or cross-section in a direction perpendicular to the output beam path. Additionally, the input light source may be composed of wavelengths corresponding to one specific color, a plurality of specific colors, or may comprise white light.

With reference again to FIG. 4, in an example embodiment, a desired combination of efficiency and beam quality may be achieved when the lengths L1 and L2 along the curves 141, 143 from the openings 106, 114, respectively, relate to the width W (see FIG. 6) of each leg 104, 112 and 120 with a ratio of approximately 6:1 (L:W). Where the lengths L1 and L2 and the width W have a ratio of approximately 6:1, the efficiency of the beam combining may be at a desirable efficiency, for example optimal homogenization at minimal cost. The desired or optimal efficiency may occur where a top hat profile is uniform to within excess of 98 percent of the optimum design. Stated differently, the measured intensity difference across the homogenized output beam may be uniform to within 2%. However, a range of L:W of about 5:1 to about 7:1 may also be acceptable. In a given embodiment, a designer may determine acceptable or desirable parameters for a given application. In an example embodiment, the width W may be in a range from about 4-6 mm or about one quarter of an inch. The lengths L1, L2 may be in a range from about 20-42 mm or about one and a half inches.

Light sources 510, 511 emit or conduct the input light beams 110, 118 having a Gaussian intensity distribution 218 (FIG. 5) and applied to openings 106, 114 of LHCA 100. Light beams 110, 118 may have cone patterns where the light may be applied to a substantially central portion of openings 106, 114 equidistant from each side of openings 106, 114, as illustrated, for example, in FIG. 5. Referring again to FIG. 4, light beams 110, 118 may then be applied to the highly reflective interior surfaces 103 of the LHCA 100. As the applied light beam travels down the lengths L1, L2, they undergo numerous reflections, combine at the junction 130 and emerge as an output beam having a top hat profile 318, 322 (FIG. 6) from an output end 124 of LHCA 100. During each of the reflections within an interior region of LHCA 100, the beam actually folds over onto itself resulting in the creation of a highly-uniform, homogenous top hat profile. After a minimum of five such reflections, the beam may be considered homogenous. The lengths L1, L2 may be, for example about 42 mm (millimeters) while the width (or diameter) of the legs 104, 112, 120 may be about 7 mm.

Figure 5:
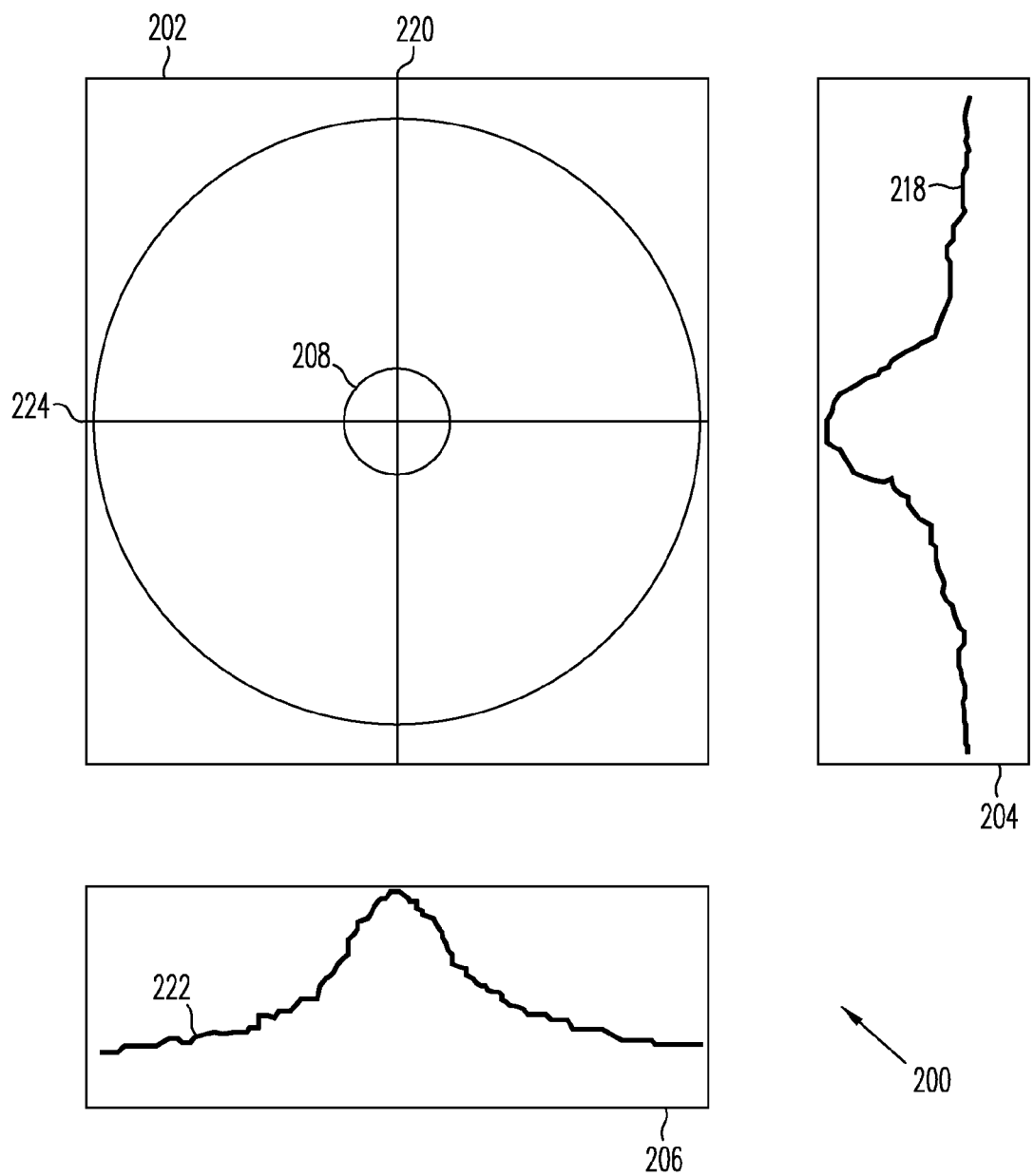
FIG. 5 illustrates a graphical intensity depiction including three plane views of an input Gaussian light beam, in accordance with an embodiment.

FIG. 5 illustrates a graphical intensity depiction 200 including three plane views (202, 204, 206) of an input Gaussian light beam 208, in accordance with an embodiment of the present disclosure. Depiction 200 includes a frontal plane view 202 showing a two-dimensional intensity distribution of an exemplary cross-section of the input Gaussian light beam 208, a profile plane view 204 showing a Gaussian distribution curve 218 depicting the intensity across a central vertical diameter 220 or span, and a horizontal plane view 206 showing a Gaussian distribution curve 222 depicting the intensity across a central horizontal diameter 224 or span.

As shown in FIG. 5, the light intensity profile varies across the diameter of the optical channel, in a direction perpendicular to the cross section of the channel, with a typical Gaussian intensity distribution. The light source may be a single point source such as a fiber optic cable, multiple point sources such as a fiber bundle, or an omni-directional source where only a portion of the emitted light from the source is received by the homogenizing and combining device. The wavelength of each light source may be monochromatic or polychromatic, coherent or incoherent.

Figure 6:
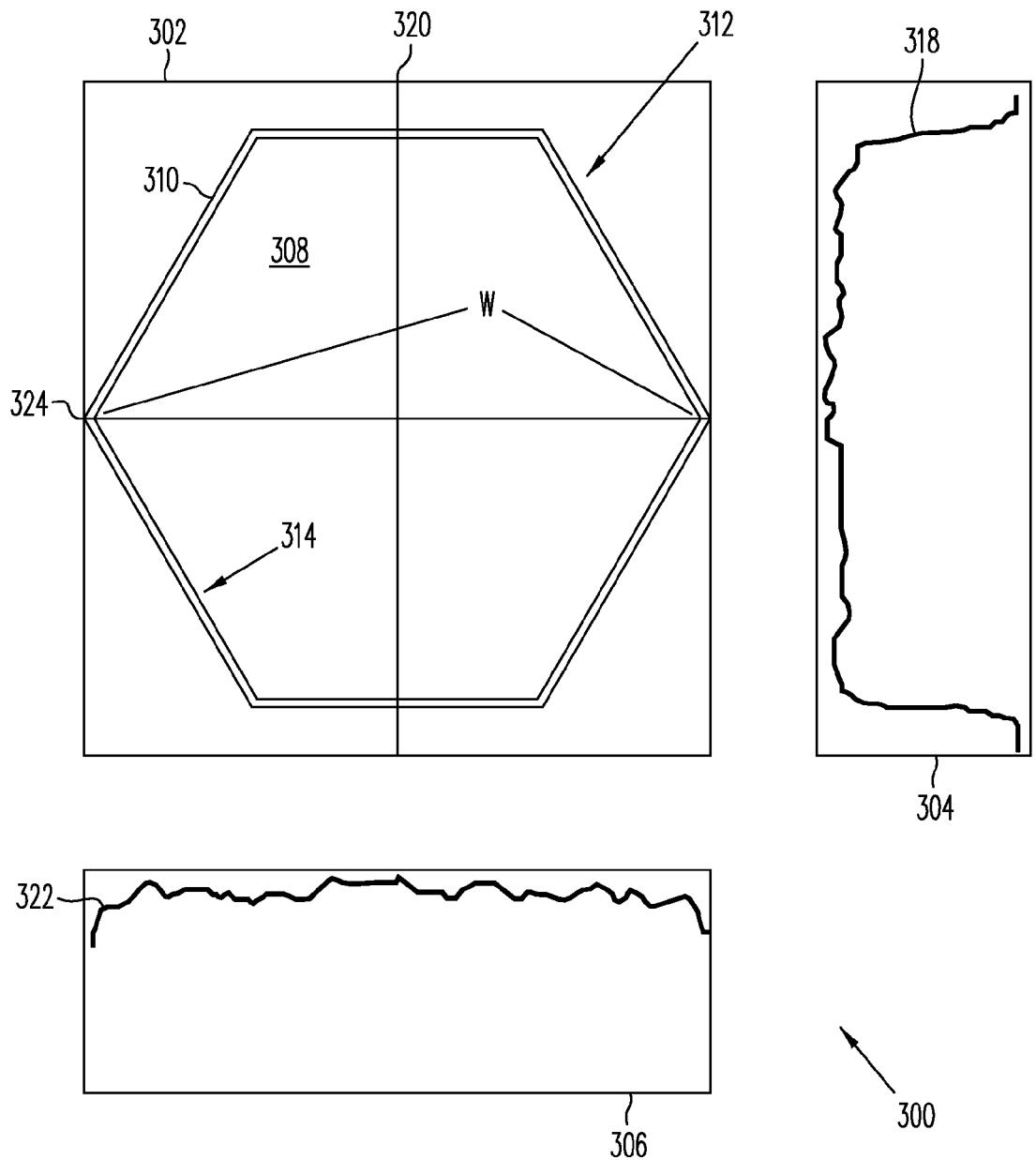
FIG. 6 illustrates a graphical intensity depiction including three plane views of an output top hat light beam from a tubular member having a hollow polygonal cross-section and a highly reflective interior surface, in accordance with an embodiment.

FIG. 6 illustrates a graphical intensity depiction 300 including three plane views (302, 304, 306) of an output top hat light beam 308 from a tubular member 310 having a hollow polygonal cross-section 312 and a highly reflective interior surface 314, in accordance with an embodiment of the present disclosure. In this example, the polygonal cross-section of tubular member 310 may be a hexagon comprising six, equal-size planar side members, but this is not considered limiting. Specifically, depiction 300 includes a frontal plane view 302 showing an end view of a tubular member having a two-dimensional intensity distribution for an exemplary cross-section of the output top hat light beam 308, a profile plane view 304 showing a top hat distribution curve 318 depicting the intensity across a central vertical diameter 320 or span, and a horizontal plane view 306 showing a top hat distribution curve 322 depicting the intensity across a central horizontal diameter 324 or span of the polygonal cross-section.

As shown in FIG. 6, the light intensity profile of output light beam 308 does not substantially vary across the diameter of the optical channel, in a direction perpendicular to the cross section of the channel, with a typical top hat intensity profile or distribution. The top hat intensity profile may be provided for all homogenized output light beams. This conversion to a top hat profile is important especially when LHCA 100 (FIGS. 1, 4) is used to project an output beam 308 (126 in FIGS. 1, 4) into a bundle of fibers. The homogenous nature of the output beam will assure that each individual fiber within the bundle will receive the same intensity of light. In this manner, the highly reflective interior surfaces 314 of tubular member 310 or body 102 (FIGS. 1, 4) may cause a light beam to fold over onto itself numerous times while passing through body 102, thus reshaping the original input Gaussian profile beam into a highly-uniform, homogenous top hat profile beam.

Input light beams 110, 118 (FIGS. 1, 4) may each be a point source of white light having a wavelength range from about 380 nm to 780 nm covering the spectrum of visible light. For visible light or for white light, a silver reflective surface within tubular body 102 will provide the highest efficiency. Alternatively, input light beams (110, 118) may include any light components above and/or below the visible spectrum. For the present disclosure, white light may include a light beam that includes a plurality of wavelengths, and is thereby differentiated from single wavelength light beam having a particular color. In another example embodiment, the reflective surface within a tubular body 102 may be gold. Gold may provide a desired efficiency, for example, where the input light beams are in the infra-red region of the spectrum. Other materials may be used as desired depending on the wavelength of the input/output light.

The source of input light beams (110, 118) may be any light conductor or light emitter including a light conducting tubular member placed adjacent to or partially within an input end portion opening 106, 114 (FIGS. 1, 4), an output end portion of an optical cable such as a fiber-optic cable or bundle placed adjacent to or partially within an input end portion (106, 114), and/or a white light emitter such as an incandescent lamp, a fluorescent lamp, an Organic Light Emitting Diode (OLED), a chemical light source including a flame, the sun, and/or any other source of illumination directed toward, placed adjacent to, or partially within an input end portion (106, 114). The insertion distance partially within an input end portion (106, 114) may be up to about twice the diameter of an input light beam (110, 118) through an insertion plane that may be parallel to an outer edge of planar input end portions (106, 114).

Figure 7:
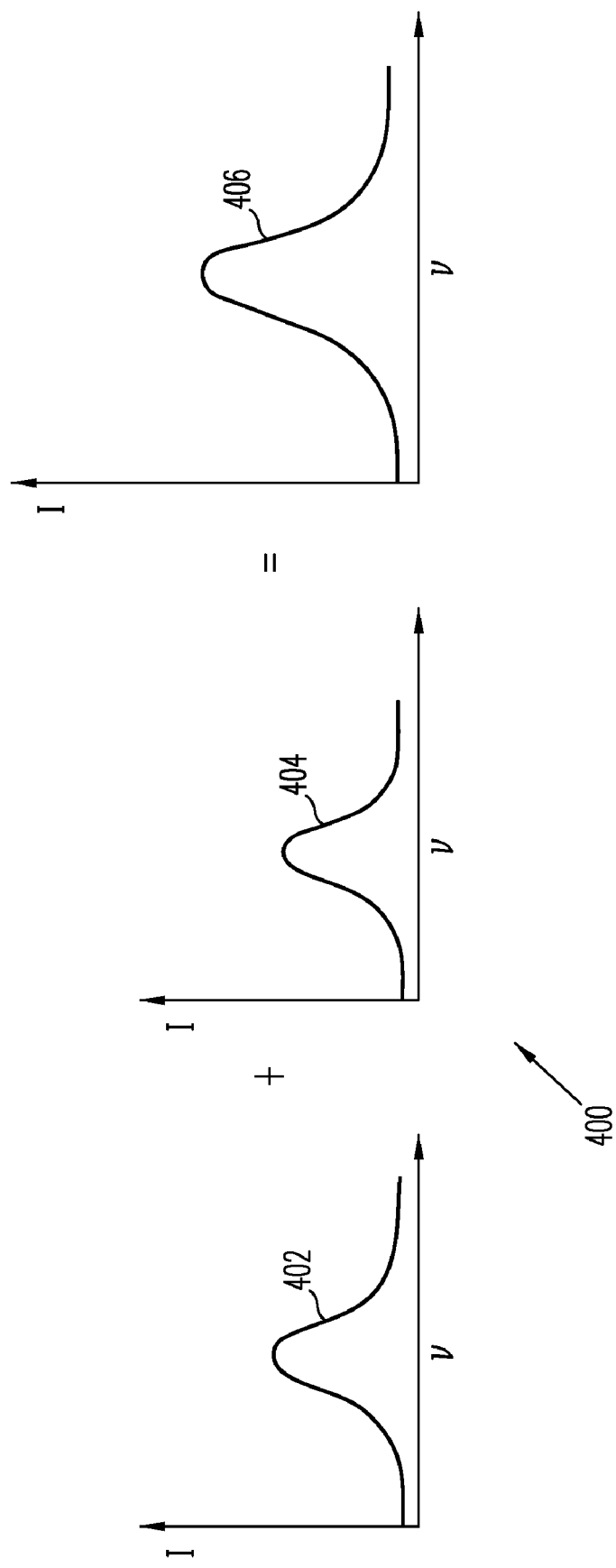
FIG. 7 illustrates a graphical sum illustrating an exemplary combination of a first input beam and a second input beam, where a combined output beam has an intensity that is the sum of the intensities of the input beams, in accordance with an embodiment.

FIG. 7 illustrates a graphical sum 400 illustrating an exemplary combination of a first input beam 402 and a second input beam 404, where a combined output beam 406 has an intensity that is the sum of the intensities of the input beams (402, 404), according to an embodiment of the present disclosure. When the input beams are of different wavelengths (i.e. are of different colors) the output beam will be of a third wavelength that is a combination of the input wavelengths. In this manner, a homogenized output beam having a third color may be generated (color generator) based on two Gaussian input beams having two different colors.

Figure 8:
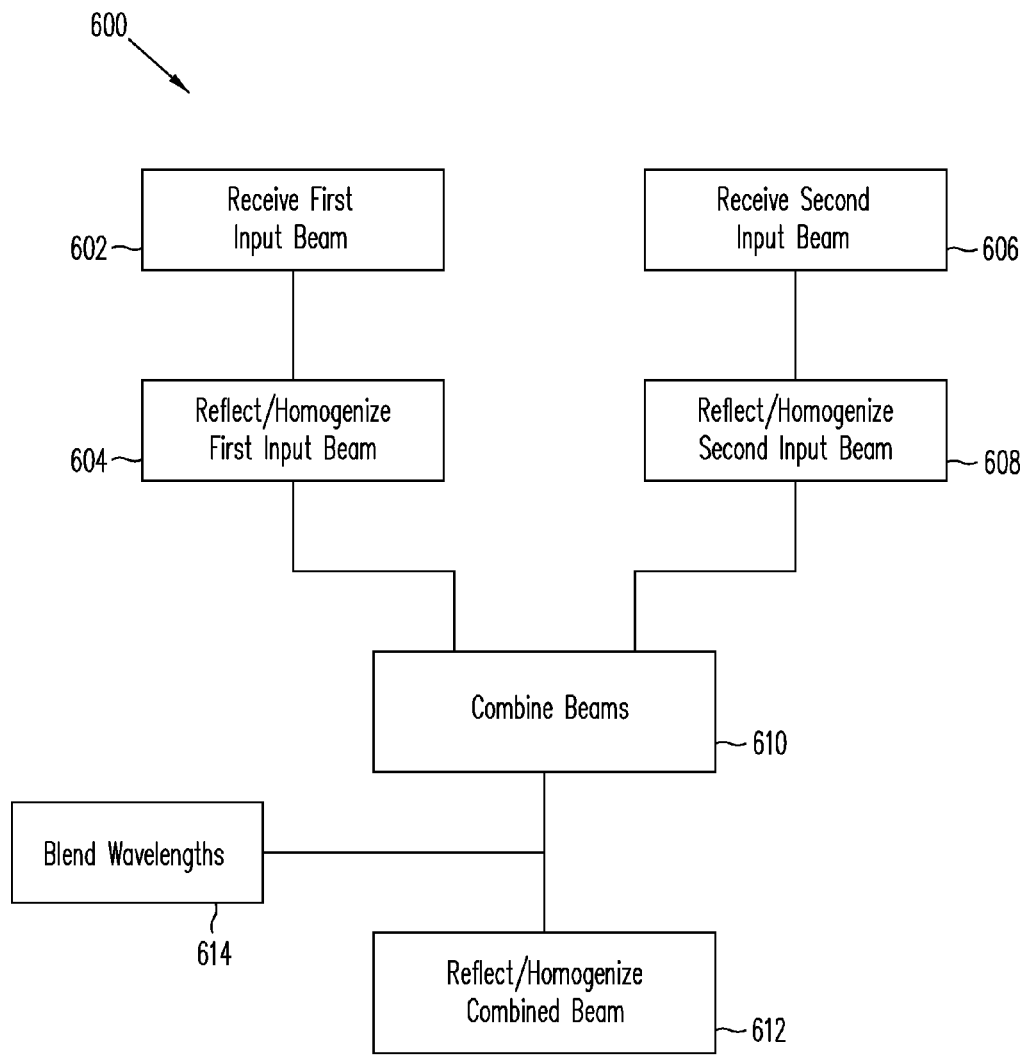
FIG. 8 illustrates an exemplary embodiment of a method of using an exemplary embodiment of a light homogenizing and combining apparatus.

FIG. 8 illustrates a method 600 of using a light homogenizing and combining apparatus, according to an embodiment of the present disclosure. In an example embodiment, input light beams 110, 118 (FIG. 4) are received 602, 606 in first and second input legs 104, 112 (FIG. 4), respectively. The input light beams 110, 118 may have Gaussian intensity profiles 218, 222 (FIG. 5). In an example embodiment, the light beams 110, 118 may be emitted from a light sources 510, 511 (FIG. 4), for example fiber optic cables, and be applied to input openings 106, 114 (FIG. 4), respectively. The input light beams 110, 118 may be reflected within the legs 104, 112 to produce 604, 608 first and second leg output beams 110', 118'. In this manner, the Gaussian first input light beams may be reshaped into at least partially homogenized top hat profile beams after repeated reflections from the inside surfaces of tubular body 102 (FIG. 4). In an example embodiment, the first and second leg output beams 110', 118' may be homogenized, for example completely homogenized in the first and second legs.

In an example embodiment, the at least partially homogenized beams 110', 118' may be combined 610 in the output leg 120 (FIG. 4) of the tubular body 102. The combined beam may be reflected and homogenized 612 within the output leg 120 to produce a combined homogenized output beam 126 at the output opening 124 (FIG. 4). In this manner, combined homogenized output beam 126 or 406 (FIG. 7) may have a top hat profile and amplitude that is nearly the sum of the amplitudes of the input beams. Further, when the input beams (110, 118) have different wavelengths, the combined beams may be blended 614 so that the output beam 126 has a new color that is a combination of the wavelengths present in the input beams.

Although an exemplary embodiment of the method 600 illustrates a combination of two Gaussian light sources, this process may be utilized for three or more input beams, where the transmitted beam from a prior homogenization and combination stage (i.e. a first LHCA 100) may be asserted to a latter homogenization and combination stage (i.e. a second LHCA 100) so that more than two input beams may be homogenized and combined to produce a top hat profile output beam that is a combination of all input beams. In an example embodiment, the overall system will have an efficiency of at least 92.5 percent, for example greater than 93 percent.

Figure 9:
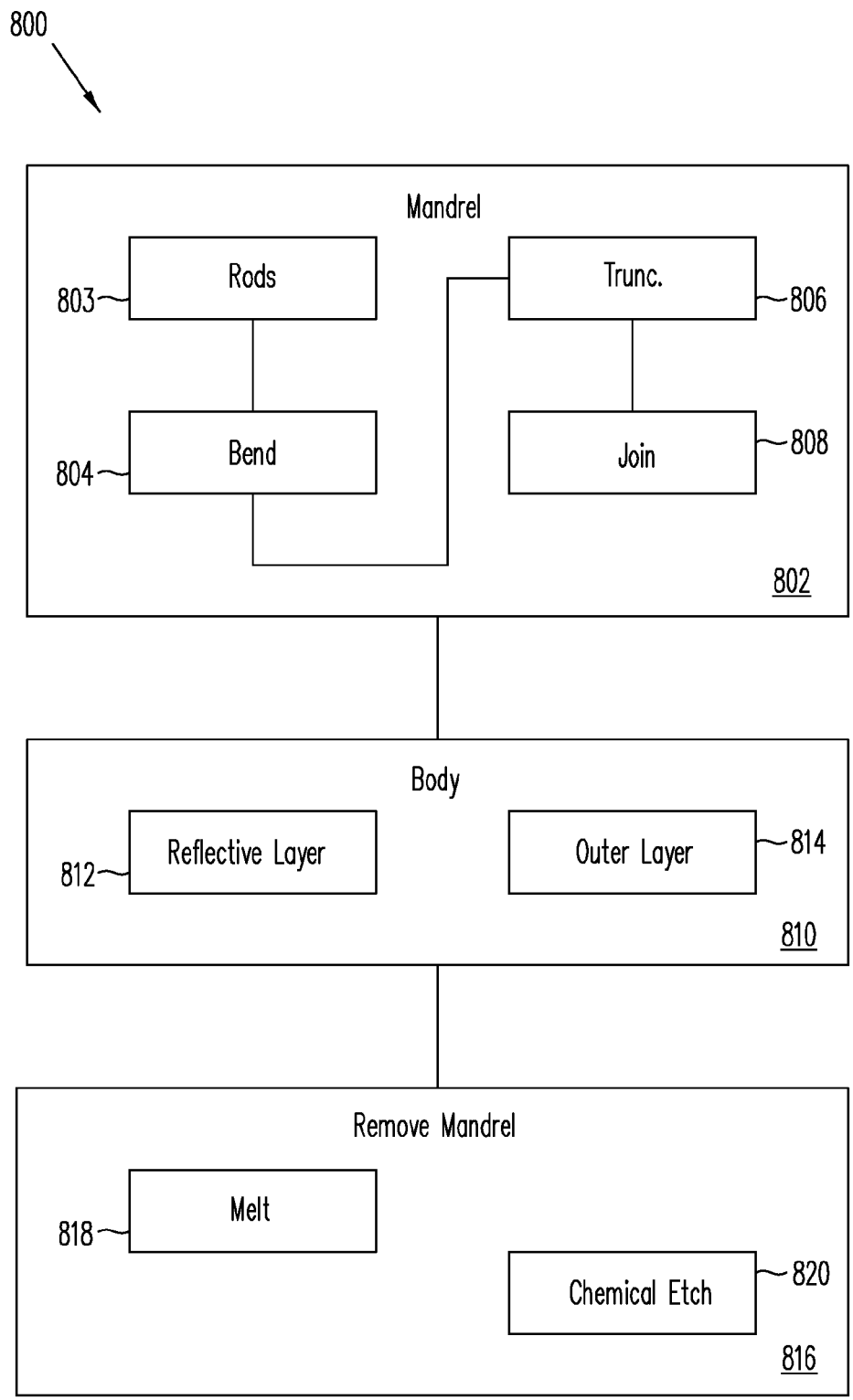
FIG. 9 illustrates an exemplary embodiment of a method of fabricating a light combining and homogenizing apparatus in accordance with an embodiment of this present disclosure.

FIG. 9 illustrates an exemplary method 800 of fabricating an LHCA 100. In one embodiment, a body 102 (FIG. 1) may be fabricated in an electroplating or electroforming process 800 using a shaped form or mandrel, the exterior shape of the mandrel corresponding to the shape of interior reflective surfaces of the LHCA to be formed. The method may include providing 802 the mandrel. The mandrel may be formed from a material onto which a metal which can provide a highly reflective interior surface may be electroplated. For example, the mandrel may be formed from material which is metal, for example aluminum. The melting point of the material from which the mandrel is formed may have a lower melting point than the metal used to form the body 102.

The mandrel may be provided 802 or formed by any process of casting, forming, injection molding or tooling to provide a non-metal mandrel 803 with the desired shape to provide a desired shape of the interior surfaces. In an example embodiment, the mandrel may be formed in a die by injection molding. The form may be, for example, wax. Aluminum may be deposited 804 on the form and the form melted away 806. The resulting aluminum mandrel may be used for fabricating the body of the LCHA.

Figure 10:
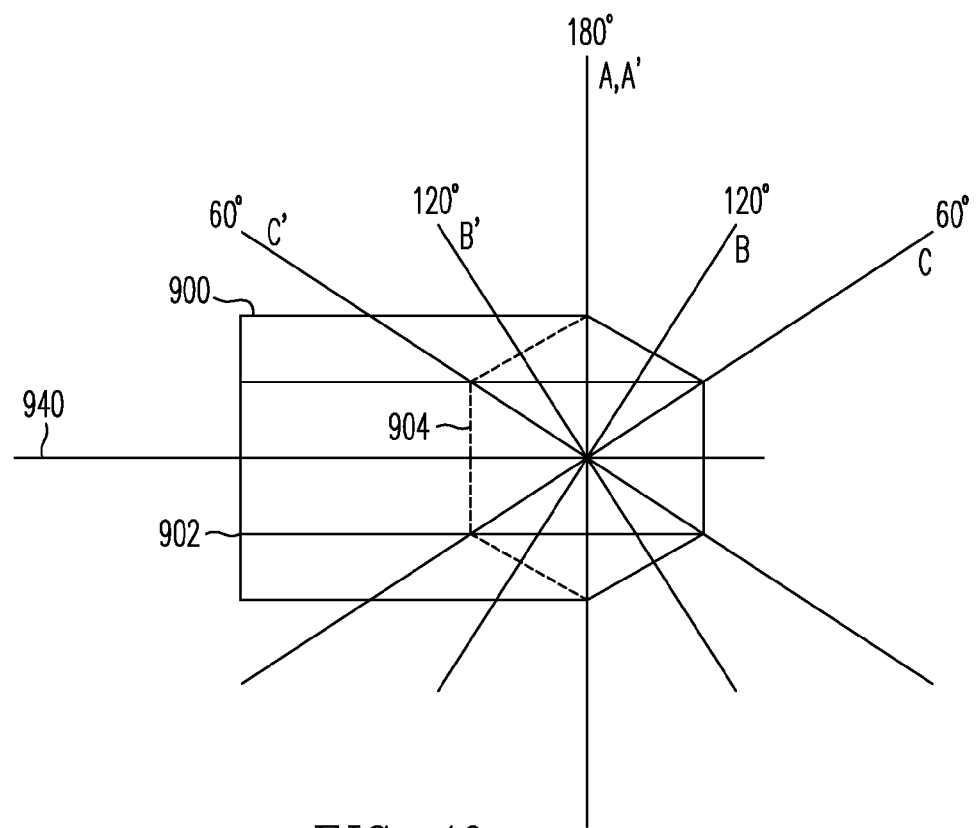
FIG. 10 illustrates an overhead view of an exemplary embodiment of a bent polygonal rod shape for used in the fabrication of a light combining and homogenizing apparatus.

FIG. 10 illustrates an overhead view of a bent rod shape 900. The bent rod shape has a first end 902, corresponding to an opening of a first or second leg of an LHCA. The shape has a second end 904 corresponding to an exit opening of an LHCA. In the embodiment shown in FIG. 10, the rod shape 900 is bent at a 90 degree angle with an axis 940 of the first end 902 being at about 90 degrees with respect to an axis of the second end.

Figure 3A:
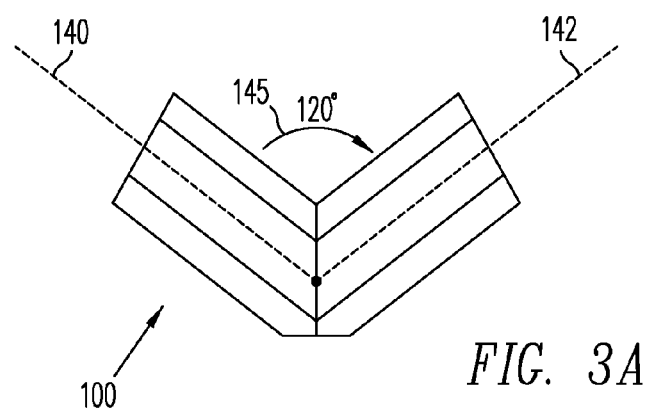
FIG. 3A illustrates an overhead view of the light homogenizing and combining apparatus of FIG. 3.

In an example embodiment, the shape may be truncated along any plane that bisects the end portion of the rod shape corresponding to the output beam opening 904. Two rod shapes truncated along the plane A, A' may be placed together to form a mandrel corresponding to the LHCA of FIG. 1. In an example embodiment, the two bent rod shapes truncated along the planes B, B' may be joined together to form the shape of a mandrel corresponding the LHCA of FIG. 3A with an angle 145 of 120 degrees between the axes 140 and 142 with respect to the axis 144. Two bent rod shapes truncated along the plane C, C' may be placed together to form a mandrel corresponding to an LHCA in which the angle 145 is 60 degrees (not shown). For shapes having other polygonal cross-sections, other angles may be achieved.

Referring again to FIG. 9, in an example embodiment, the body may be plated 810 onto the mandrel to build up a "stand alone" thickness where the highly reflective interior surface plating surrounding the mandrel is structurally self-supporting. In one embodiment, plating 810 the body onto the mandrel may include coating 812 the aluminum form or mandrel with a highly reflective layer corresponding to the highly reflective interior surface of an LHCA to be formed. The highly reflective layer may include, for example, silver, gold, or other highly reflective plating material. The highly reflective layer may then be coated 814 with an outer layer. The outer layer may be a stronger material, for example nickel, that may bond with and/or structurally support the highly reflective plating to provide structural rigidity for the body having a highly reflective interior surface. The highly reflective layer may be very thin because the majority of structural support for body is provided by an outer plating layer.

In an exemplary embodiment, the highly reflective layer may only be a few atomic layers thick while the outer layer may be composed of nickel that may be approximately 0.002-inches thick. The thickness of the outer layer may be determined by the properties of the selected material and the rigidity requirements of a particular mission or application. By reducing the thickness of the highly reflective layer, the cost of the manufactured device may be kept low when the highly reflective material layer may be composed of silver, gold, or other precious metal. Generally, the composition of the highly reflective material depends upon the wavelength of light being reflected within the tubular member being formed. In one preferred embodiment, the highly reflective material layer is composed of silver to reflect white light with maximum efficiency.

The mandrel may then be removed 816, for example by melting 818, chemically etching 820, and/or exploiting some other property such as a difference between the thermal coefficients of expansion between the mandrel and the plating in order to remove the mandrel and form body. Once the outer layer is formed, the aluminum form or mandrel may then be chemically melted away leaving the highly reflective, or highly polished, interior surface within body 102.

In an example embodiment, light combining and homogenizing apparatuses according to the present disclosure may solve several problems without the use of any optical or glass elements such as beamsplitters, mirrors and the like. The LCHA may convert Gaussian profile input light beams to a highly homogeneous, top hat profile beam. It may combine the intensity of each initial light beam into a new single higher intensity output beam. It may also be used to combine two beams of different wavelengths (colors) into a new single output beam with a totally different wavelength (color). In this mode, the LCHA may act as a wavelength/color generator, enabling the operator to generate a new colored light beam depending strictly upon the wavelength (color) of the two initial light sources. A LCHA according to the present disclosure may not require initial alignment steps and may therefore be less susceptible to misalignment and possible optical contamination than other approaches. An LCHA according to an embodiment of the present disclosure may avoid the costs of additional hardware or components of other approaches and may be smaller and more compact. It may also avoid intensity losses that may occur in the multiple optical elements used in other approaches.

Figure 11:
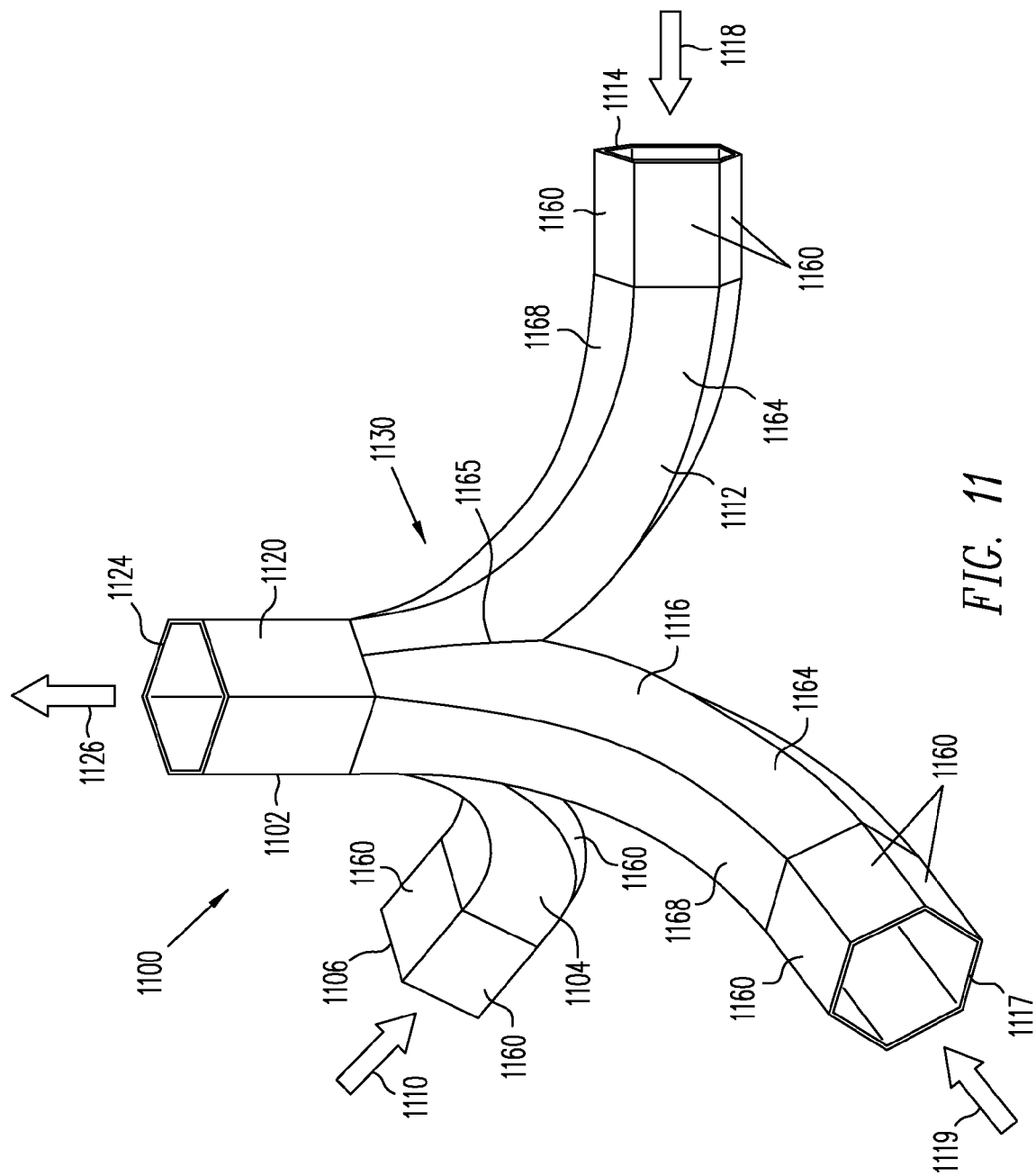
FIG. 11 illustrates a tri-light homogenizing and combining apparatus (THCA), which may be referred to as a multi-color curved tri-light generating apparatus, in accordance with one or more embodiments of the present disclosure.

FIG. 11 illustrates a tri-light homogenizing and combining apparatus (THCA) 1100, which may be referred to as a multicolor curved tri-light generating apparatus, in accordance with one or more embodiments of the present disclosure. As shown in FIG. 1, the THCA 1100 may comprise a one-piece, closed, hollow tubular member, or tubular body 1102 having legs 1104, 1112, 1116 and 1120. Each leg 1104, 1112, 1116 and 1120 may comprise a polygonal cross-section (e.g., a hexagonal cross-section) and have highly reflective interior surfaces.

The body 1102, in one embodiment, includes a first leg 1104, or a first input leg, having an opening 1106 configured to receive a first Gaussian light beam 1110 of a first intensity and spectral content $S_1$ or color $\lambda_1$. The light beam 110 is reflected within first leg 1104 to provide a first leg output beam 1110' (FIG. 14) that is at least partially homogenized.

The body 102, in one embodiment, includes a second leg 1112, or a second input leg, having an opening 1114 configured to receive a second Gaussian light beam 1118 of a second intensity and spectral content $S_2$ or color $\lambda_2$. The light beam 1118 may be reflected within second leg 1112 to produce a second leg output beam 1118' that is at least partially homogenized.

The body 102, in one embodiment, includes a third leg 1116, or a third input leg, having an opening 1117 configured to receive a third Gaussian light beam 1119 of a third intensity and spectral content $S_3$ or color $\lambda_3$. The light beam 1119 may be reflected within third leg 1116 to produce a third leg output beam 1119' that is at least partially homogenized. It should be appreciated that, while three input legs are shown, this is not considered limiting.

The body 1102, in one embodiment, includes a fourth leg 1120, or an output leg, with an output opening 1124. In one aspect, the input legs 1104, 1112, 1116 and the output leg 1120 are joined so that substantially all of the energy of the first leg output beam 1110' (FIG. 12), the second leg output beam 1118' (FIG. 12), and the third leg output beam 1119' (FIG. 12) combine at a junction 1130, reflect within the fourth leg 1120, resulting in a fourth leg output beam 1126 emitted from the output opening 1124 of the fourth leg 1120.

The fourth leg output beam 1126, in one embodiment, has a fourth intensity and spectral content $S_4$ or color $\lambda_4$ that comprises a combination of the first intensity and spectral content $S_2$, the second intensity and spectral content $S_2$, and the third intensity and spectral content $S_3$. The fourth leg output beam 1126 may comprise a homogenized top hat profile. In one implementation, as described in greater detail herein, a fourth leg output beam from a first THCA 1100 may be applied as an input beam to a second THCA 1100, so that a plurality of Gaussian light beams may be combined in a sequential or serial manner.

It should be appreciated that, while the THCA 1100 may have a hexagonal cross-section, other geometrical cross-sections may also be utilized including triangular, square, pentagonal, heptagonal, and octagonal, for example. In various implementations, the first leg 1104, second leg 1112, third leg 1116, and fourth leg 1120 may each have the same or different geometrical cross-sections, without departing from the scope of the present disclosure.

In accordance with one or more embodiments of the present disclosure, the color of light may refer to the wavelength or frequency distribution, band, or spectral content of the light and may include both visible and invisible wavelengths. Hence, in various aspects, while a particular spectra or wavelength may be described for each beam, it should be appreciated that a color of a beam may refer equally to its frequency components and associated intensity for each component and may be referred to as a frequency profile, spectral content, or spectral power distribution (SPD) for the associated beam.

The THCA 1100, in various embodiments, comprises a shape corresponding to a plurality of truncated, bent tubes joined along a junction to define an enclosed THCA. As shown in FIG. 11, the bent tubes may have a polygonal cross-section (e.g., a hexagonal cross-section). The tubes may be truncated along a plane parallel with the axis of the output leg 1124, as similarly shown in FIG. 2 with reference to the axis 144 of the output leg 124. In one aspect, the tubes may be truncated such that the edges of one of the bent tubes along the plane of truncation match up with the edges of the other bent tube along the corresponding plane of truncation so that the truncated, bent tube shapes form a closed THCA when the input openings 1106, 1112, 1116 and the output opening 1124 are joined together at the junction 1130.

The THCA 1100, in various embodiments, may include a plurality of side members 1160, which include junction side panels 1164 and continuous side panels 1168. The junction panels 1164, 1168 have junction edges 1165 that lie in a common plane such that the plane is parallel to the axis of the output leg 1120. In one aspect, the joined junction edges 1165 define the junction 1130.

In various implementations, first ends of some of the continuous panels 1168 together with first ends of some of the junction panels 1164 define the first input tube 1104 and the first input opening 1106. First ends of other continuous panels 1168 together with first ends of other junction panels 1164 define the second input leg 1112 and the second input opening 1114. First ends of still other continuous panels 1168 together with first ends of still other junction panels 1164 define the third input leg 1116 and the third input opening 1117. In one aspect, second ends of the continuous panels 1168 may be joined together to define the output leg 1120 and the output opening 1124.

In accordance with one or more embodiments of the present disclosure, the THCA 1100 comprises a multi-color curved tn-light generating apparatus having at least three curved input legs 1104, 1112, 1116 that merge into a single mixing chamber 1130 with a single output leg 11120, and each of the legs 1104, 1112, 1116 comprises a hollow multi-sided shape (e.g., hexagonal shape) having highly polished reflective interior surfaces 1103 that allow for uniform mixing (i.e., combining). In one aspect, a plurality of individual, distinct colors, and/or wavelengths may be combined to form a single colored output beam 1121. As such, a plurality of separate colors and/or wavelengths of light 1110, 1118, 1119 may be inputted and combined to form an output beam 1121 having a single wavelength of a highly uniform colored light, which is achieved with the principle of optical reflection.

As shown in FIG. 11, the THCA 1100 comprises three input legs 1104, 1112, 1116 and one output leg 1120, wherein three different color light sources 1110, 1118, 1119 are supplied into the input legs 1104, 1112, 1116 (i.e., with one color per leg). The light beams 1110, 1118, 1119 travel down each input leg 1104, 1112, 1116, respectively, and are transformed into a highly homogenized beam at the junction 1130 (i.e., mixing chamber) of the three input legs 1104, 1112, 1116. In one aspect, the three separate light beams 1110, 1118, 1119 mix together and produce a new colored light beam 1121 with an intensity equal to approximately the sum of the intensities of the original three light beams 1110, 1118, 1119. The new colored, higher intensity light beam or source travels down the output leg 1120 for homogenizing, and then exits the output leg 1120 as a highly uniform light beam or source 1121. The mixing and production of the new output light beam 1121 is accomplished with optical reflection, which provides improved efficiency (e.g., >96%) and reliability. In accordance with various embodiments of the present disclosure, the THCA 1100 provide a low cost, lightweight, rugged, and reliable light homogenizing and combining apparatus.

Figure 12:
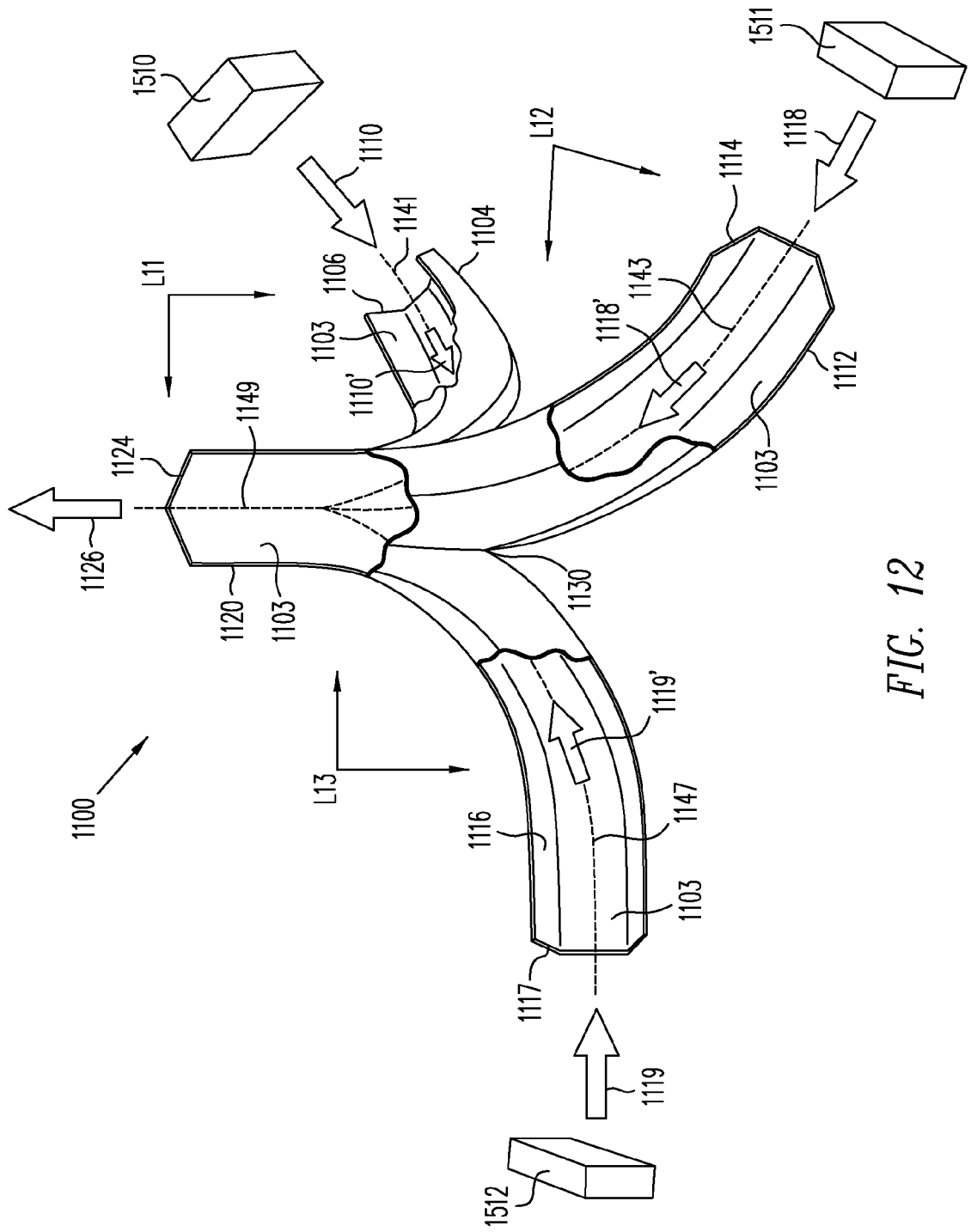
FIG. 12 illustrates a cross-sectional view of the THCA of FIG. 11, in accordance with one or more embodiments of the present disclosure.

FIG. 12 illustrates a cross-sectional view of the THCA 1100 of FIG. 11, in accordance with one or more embodiments of the present disclosure. The tubular leg portions 1104, 1112, 1116 and 1120 of the body 1102 comprise polygonal cross-section shapes (e.g., hexagonal shapes) with the plurality of side members 1160 having highly reflective interior surfaces 1103, so that light beams reflecting off an interior surface of these planar side members are reflected or folded over a plurality of times (e.g., at least five times). In various aspects, the interior surfaces 1103 may be coated to match particular wavelengths of light.

In one embodiment, the first input leg 1104 and the output leg 1120 define a curved shape for which the geometric center of the polygonal cross-section of the curved shape defines a curve 1141. The second leg 1112 and the output leg 1120 define another curved shape, wherein the geometric center of the curved shape defines another curve 1143. The third leg 1116 and the output leg 1120 define still another curved shape, wherein the geometric center of the curved shape defines still another curve 1147. As such, the curves 1141, 1143 and 1147 merge into the same curve 1149 at some point before or at the opening 1124 of the output leg 1120.

In one implementation, there is a distance L11 along the curve 1141 from the opening 1106 to the opening 1124, another distance L12 along the curve 1143 from the opening 1114 to the opening 1124, and still another a distance L13 along the curve 1147 from the opening 1116 to the opening 1124. The distances L1, L2, L3 may be sufficiently long to permit incoming light beams 1110, 1118, 1119 to reflect off the interior surfaces 1103 of the side members 1160 and be reflected or folded over a plurality of times (e.g., at least five times) before exiting the opening 1124 of the output leg 11120 as the output beam 1126.

In another implementation, the distances L1, L2, L3 may be sufficiently long to permit the incoming light beams 1110, 1118, 1119 to reflect off an interior surface of the side members and be reflected or folded over a plurality of times (e.g., at least five times) or be significantly homogenized, before being combined with each other and to permit the combined light beams to reflect off the interior surfaces of side members of the output leg and be reflected or folded over a plurality of times (e.g., at least five times) again before exiting as the output beam 1126.

In one embodiment, the input beams 1110, 1118, 1119 may have non-homogenized intensity profiles (e.g., Gaussian profiles). The first input leg 1104 may be configured to receive and reflect the first input light beam 1110 to produce at least a partially homogenized beam 1110' within the first leg 1104 as first input light beam 1110 is reflected by the highly reflective interior surfaces 1103 of the first leg 1104. Similarly, the second input leg 1112 may be configured to receive and reflect the second input light beam 1118 to produce at least a partially homogenized input beam 1118' within the second leg 1112, and the third input leg 1116 may be configured to receive and reflect the third input light beam 1119 to produce at least a partially homogenized input beam 1119' within the third leg 1116.

The output beams 1110', 1118', 1119' may be combined at the junction portion 1130 of the THCA 1100. In various aspects, the combined, at least partially homogenized beams 1110', 1118', 1119' may reflect on the highly reflective interior surfaces 1103 of at least one of the legs 1104, 1112, 1116. The fourth leg 1120 may provide the output beam 1126, which may comprise a single homogenized output beam. The intensity or amplitude of the output beam 1126 may be the sum of the plurality of input beams minus a negligible loss of about 5%. In one aspect, if the wavelengths (i.e., color) of the plurality of input beams are different from each other, then the output beam 1126 may comprise a new, derivative wavelength (i.e., color) so that the THCA 1100 may function as a wavelength blender. As such, the THCA 1100 provides homogenization and optical combining operations in a more compact, lower weight, and rugged manner while reducing alignment requirements of optical components.

Referring to FIG. 12, in various implementations, a desirable combination of efficiency and beam quality may be achieved when the lengths L1, L2, L3 along the curves 1141, 1143, 1147 from the openings 1106, 1114, 1117, respectively, relate to the width W of each leg 1104, 1112, 1116 and 1120 with a ratio of approximately 6:1 (L:W). Where the lengths L1, L2, L3 and the width W have a ratio of approximately 6:1, the efficiency of the beam combining may be at a desirable efficiency (e.g., improved homogenization at reduced cost). The desired or improved efficiency may occur where a top hat profile is uniform to within excess of 98 percent of the optimal design. Stated differently, the measured intensity difference across the homogenized output beam may be uniform to within 2%. However, a range of L:W of about 5:1 to about 7:1 may also be acceptable. In a given embodiment, a designer may determine acceptable or desirable parameters for a given application. In an example embodiment, the width W may be in a range from about 4-6 mm or about one quarter of an inch. The lengths L1, L2, L3 may be in a range from about 20-42 mm or about one and a half inches.

In one aspect, light sources 1510, 1511, 1512 emit or conduct the input light beams 1110, 1118, 1119 having a Gaussian intensity distribution 1318 (FIG. 13) as applied to openings 1106, 1114, 1117 of LHCA 1100. In one aspect, the light beams 1110, 1118, 1119 may have cone patterns, wherein the light may be applied to a substantially central portion of the openings 1106, 1114, 1117 equidistant from each side of openings 1106, 1114, 1117, as shown, for example, in FIG. 15. Referring to FIG. 12, the light beams 1110, 1118, 1119 may be applied to the highly reflective interior surfaces 1103 of the THCA 1100. As the applied light beam travels down the lengths L1, L2, L3, they undergo numerous reflections, combine at the junction 1130, and emerge as the output beam 1121 having a top hat profile 1418, 1422 (FIG. 6) from the output opening 1124 of the output leg 1120 of the THCA 1100. During each of the reflections within an interior region of the THCA 1100, the beam may fold over onto itself resulting in a formation of a highly-uniform, homogenous top hat profile. In one example, after at least five reflections, the beam may be considered homogenous. As such, in one implementation, the lengths L1, L2, L3 may be, for example, about 42 mm and the width (or diameter) of the legs 1104, 1112, 1116, 1120 may be about 7 mm.

In accordance with one or more embodiments of the present disclosure, as described in reference to FIGS. 11 and 12, the multi-color curved tri-light generating apparatus (THCA 1100) is configured to blend/mix/combine together at least three separate input light sources and/or wavelengths to form a new, singular output light source at a different wavelength without the use of any glass optical components. In one aspect, the new output beam comprises an intensity equal to within 95% of the sum of the three initial light sources intensity (approx. 3×). In another aspect, the highly reflective interior surface of the hex legs and mixing chamber reduces the need for any optical components. Since the need for any optical components is reduced, the multi-color curved tri-light generating apparatus is rugged and reliable because there are no optical components to become misaligned. As such, the multi-color curved tri-light generating apparatus may be utilized in harsh vibration conditions without misalignment concerns, which improves overall performance efficiency. The hex shape of the input legs and the output legs produces a significantly homogenous output beam with uniform structure.

Figure 13:
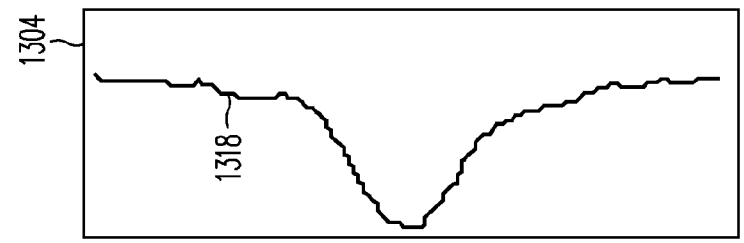
FIG. 13 illustrates a graphical intensity depiction of an input Gaussian light beam, in accordance with one or more embodiments of the present disclosure.
Figure 13:
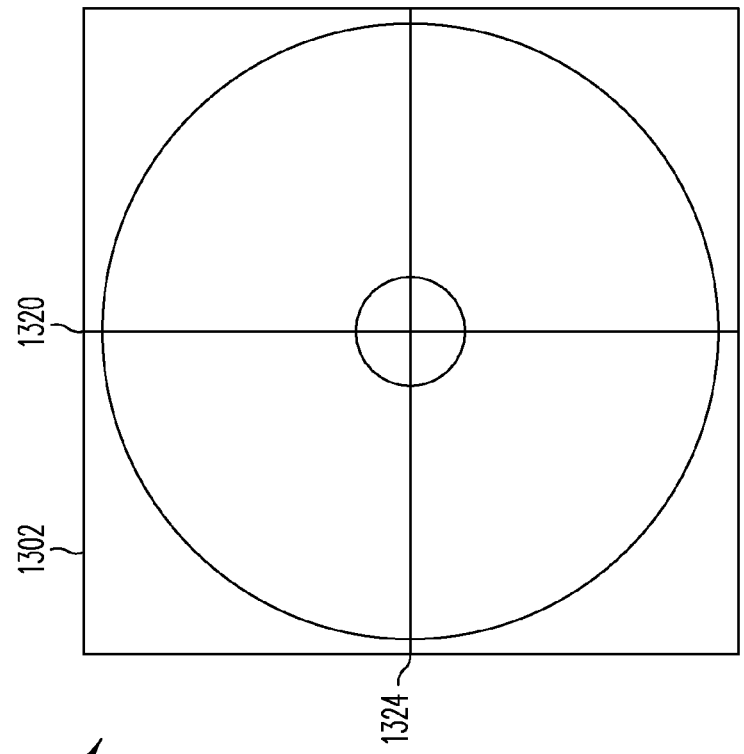
Figure 13:
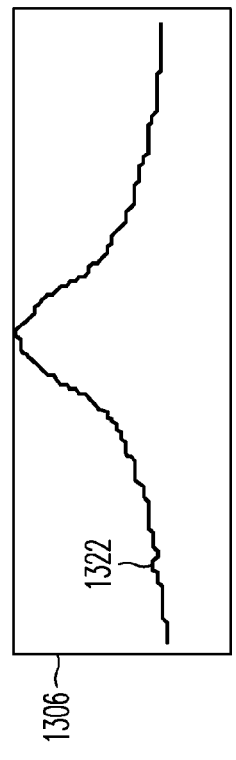

FIG. 13 illustrates a graphical intensity depiction 1300 including three plane views 1302, 1304, 1306 of an input Gaussian light beam, in accordance with one or more embodiments of the present disclosure. In one aspect, depiction 1300 includes a frontal plane view 1302 showing a two-dimensional intensity distribution of an exemplary cross-section of the input Gaussian light beam, a profile plane view 1304 showing a Gaussian distribution curve 1318 depicting the intensity across a central vertical diameter 1320 or span, and a horizontal plane view 1306 showing a Gaussian distribution curve 1322 depicting the intensity across a central horizontal diameter 1324 or span. As previously described herein, the light intensity profile may vary across the diameter of the optical channel, in a direction perpendicular to the cross section of the channel, with a typical Gaussian intensity distribution. The light source may be a single point source, such as a fiber optic source, multiple point sources such as a fiber bundle, or an omni-directional source where only a portion of the emitted light from the source is received by the homogenizing and combining device. In various implementations, the wavelength of each light source may be monochromatic or polychromatic, coherent or incoherent.

Figure 14:
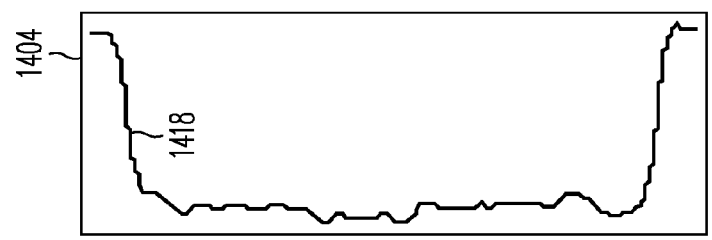
FIG. 14 illustrates a graphical intensity depiction of a homogenized output top hat light beam having a hollow polygonal cross-section and a highly reflective interior surface, in accordance with one or more embodiments of the present disclosure.
Figure 14:
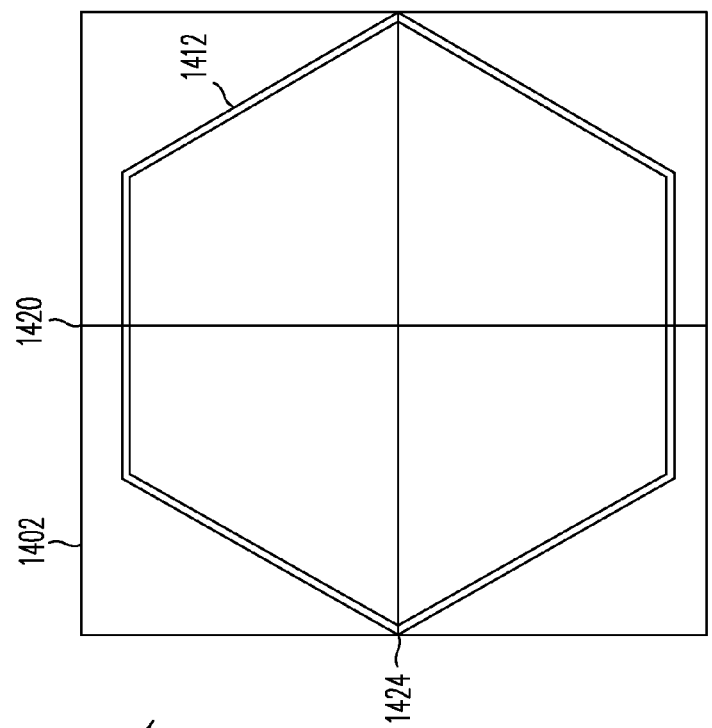
Figure 14:
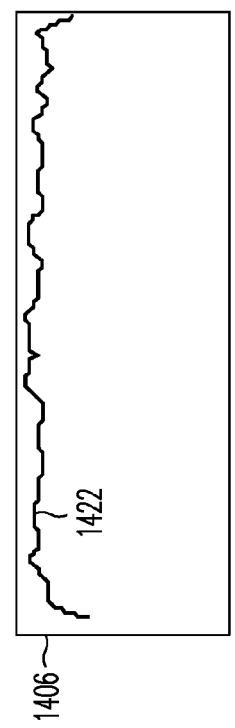

FIG. 14 illustrates a graphical intensity depiction 1400 including three plane views 1402, 1404, 306 of a homogenized output top hat light beam 1121 from the output leg 1120 of the THCA 1100 having the hollow polygonal cross-section and a highly reflective interior surface, in accordance with one or more embodiments of the present disclosure. In one implementation, the polygonal cross-section of output leg 1120 may comprise a hexagon comprising six, equal-size planar side members. In one aspect, depiction 1400 includes a frontal plane view 1402 showing an end view of a tubular member having a two-dimensional intensity distribution for an exemplary cross-section of the output top hat light beam 1408, a profile plane view 1404 showing a top hat distribution curve 1418 depicting the intensity across a central vertical diameter 1420 or span, and a horizontal plane view 1406 showing a top hat distribution curve 1422 depicting the intensity across a central horizontal diameter 1424 or span of the polygonal cross-section (e.g., hexagonal cross-section).

As shown in FIG. 14, the light intensity profile of output light beam 1408 may not substantially vary across the diameter of the optical channel, in a direction perpendicular to the cross section of the channel, with a typical top hat intensity profile or distribution. The top hat intensity profile may be provided for all homogenized output light beams. In one aspect, the conversion to a top hat profile is important especially when THCA 1100 (FIGS. 11, 12) is used to project the output beam 1121 into a bundle of fibers. The homogenous nature of the output beam 1121 may assure that each individual fiber within the bundle receives a same intensity of light. As such, the highly reflective interior surfaces 1114 of the output leg 1120 or the body 1102 may cause a light beam to fold over onto itself a plurality of times while passing through the body 1102, which may reshape the input Gaussian profile beam into a highly-uniform, homogenous top hat profile beam.

In various aspects, the input light beams 1110, 1118, 1119 may each be a point source of white light having a wavelength range from about 380 nm to 780 nm covering the spectrum of visible light. For visible light or for white light, a silver reflective surface within tubular body 1102 may provide high efficiency. Alternatively, input light beams 1110, 1118, 1119 may include any light components above and/or below the visible spectrum. In one aspect, white light may include a light beam that includes a plurality of wavelengths and may be differentiated from single wavelength light beam having a particular color. In another aspect, the reflective surface within a tubular body 1102 may be gold, which may provide a desired efficiency, e.g., wherein the input light beams are in the infra-red region of the spectrum. Other materials may be used as desired depending on the wavelength of the input/output light.

In various aspects, the source of input light beams 1110, 1118, 1119 may comprise any light conductor or light emitter including a light conducting tubular member placed adjacent to or partially within an input end portion opening 1106, 1114, 1117, an output end portion of an optical cable, such as a fiber-optic cable or bundle placed adjacent to or partially within an input end portion 1106, 1114, 1117, and/or a white light emitter such as an incandescent lamp, a fluorescent lamp, an OLED, a chemical light source including a flame, the sun, and/or any other source of illumination directed toward, placed adjacent to, or partially within an input end portion 1106, 1114, 1117. In various implementations, the insertion distance partially within an input end portion 1106, 1114, 1117 may be up to about twice the diameter of an input light beam 1110, 1118, 1119 through an insertion plane that may be parallel to an outer edge of planar input end portions 1106, 1114, 1117.

Figure 15:
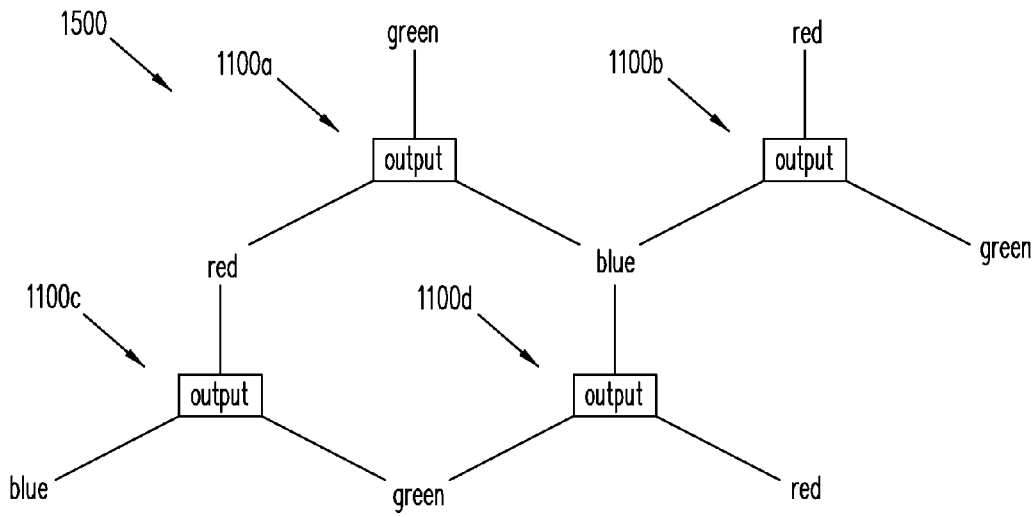
FIG. 15 illustrates an interlocking array of a plurality of multi-color curved tri-light generating apparatuses, in accordance with one or more embodiments of the present disclosure.

FIG. 15 illustrates an interlocking array 1500 of a plurality of multi-color curved tri-light generating apparatuses (e.g., THCA 1100a, 1100b, 1100c, 1100d), in accordance with one or more embodiments of the present disclosure. As shown in FIG. 15, the tri-light generating apparatuses 1100a, 1100b, 1100c, 1100d may be arranged and/or configured to form a pattern of the interlocking array 1500, which is adapted to receive a single light source to supply the legs of different units (e.g., THCA 1100a, 1100b, 1100c, 1100d). In one aspect, when arranged in this pattern, the units may be utilized as a display.

Figure 18A:
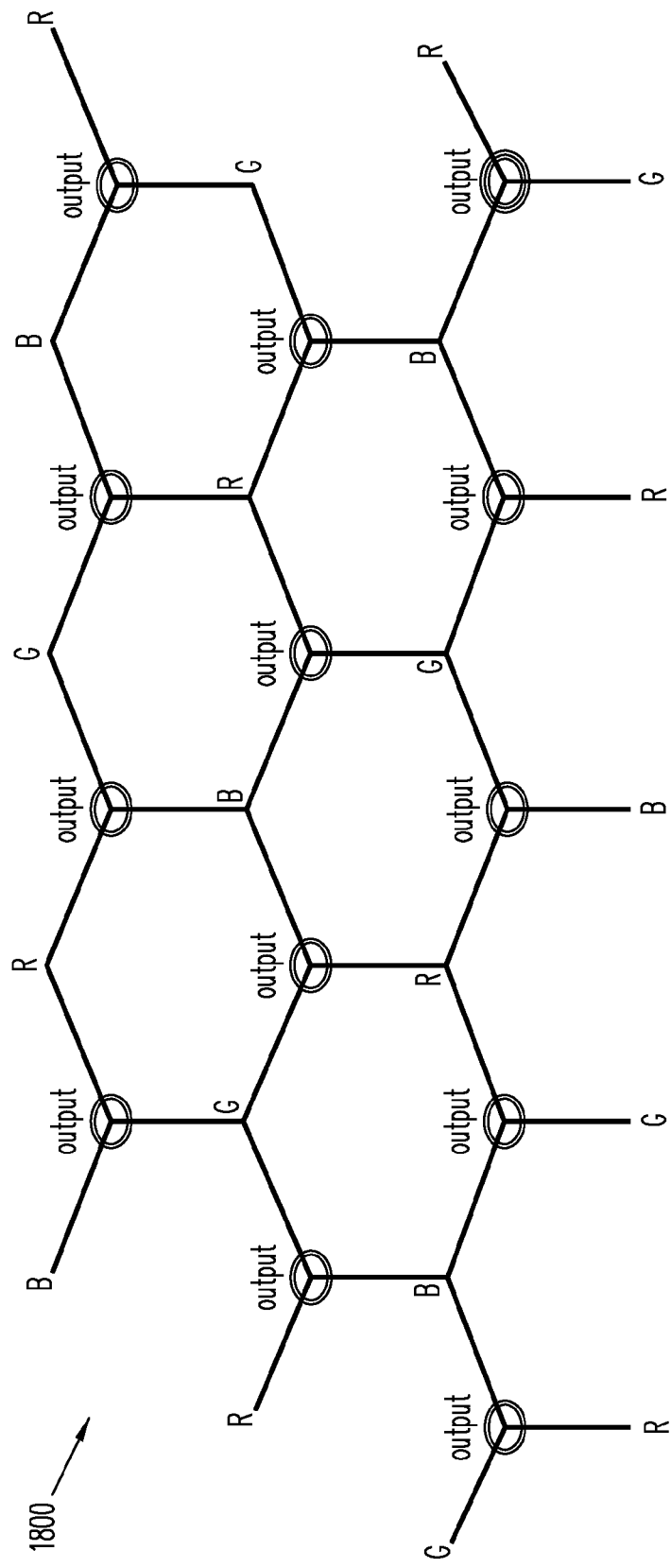
FIGS. 18A and 18B show various views of a plurality of multi-color curved tri-light generating apparatuses (e.g., THCAs) arranged to form interlocking array patterns, in accordance with one or more embodiments of the present disclosure.
Figure 18B:
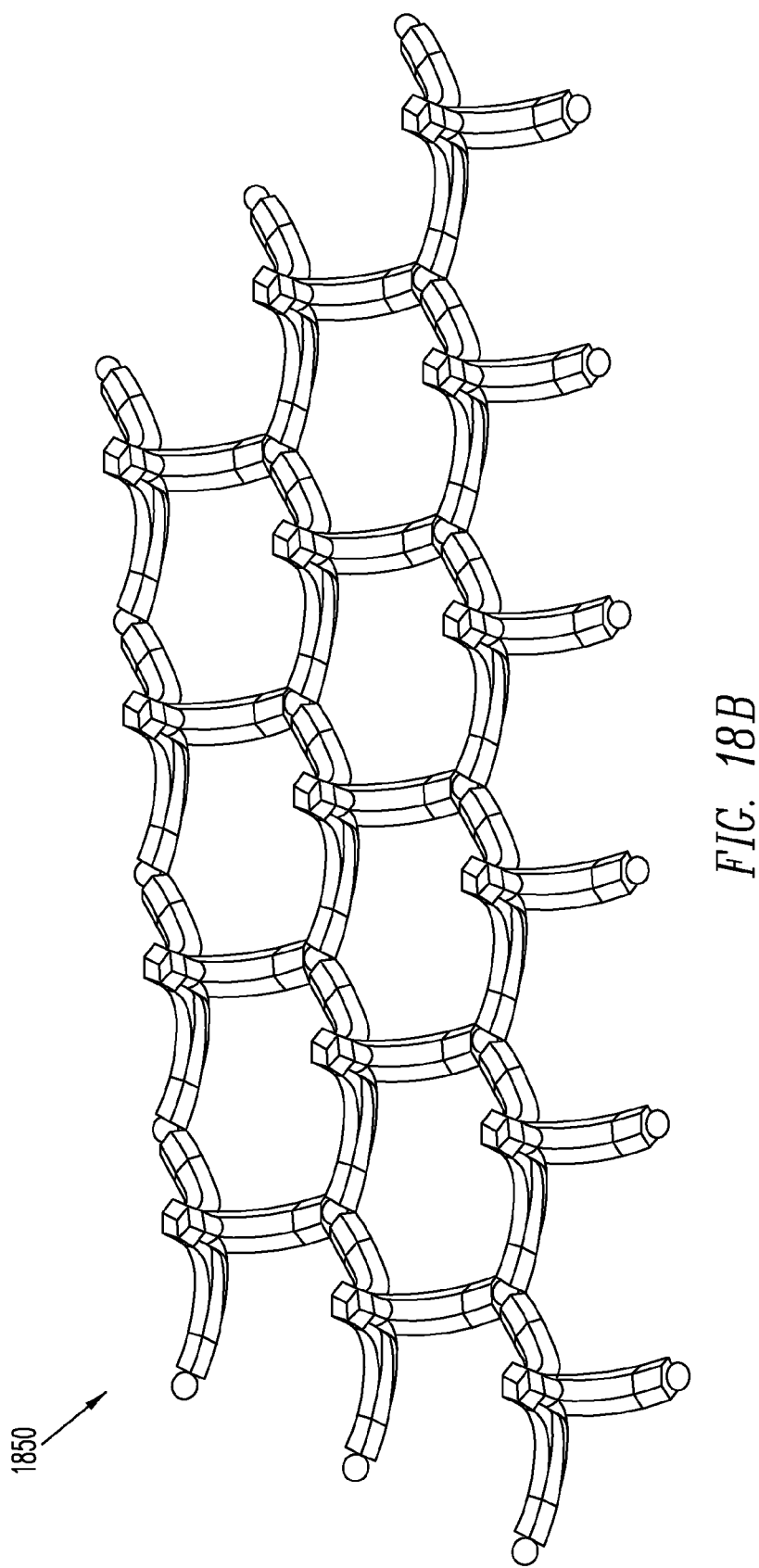

In one implementation, referring to FIG. 15, each tri-light generating apparatus 1100a, 1100b, 1100c, 1100d mixes red, green, and blue light to form a new output color, wherein the single light source may be utilized to supply three different units, and the units may be banked together, as shown in FIGS. 18A, 18B, to form a matrix for a display.

Figure 16:
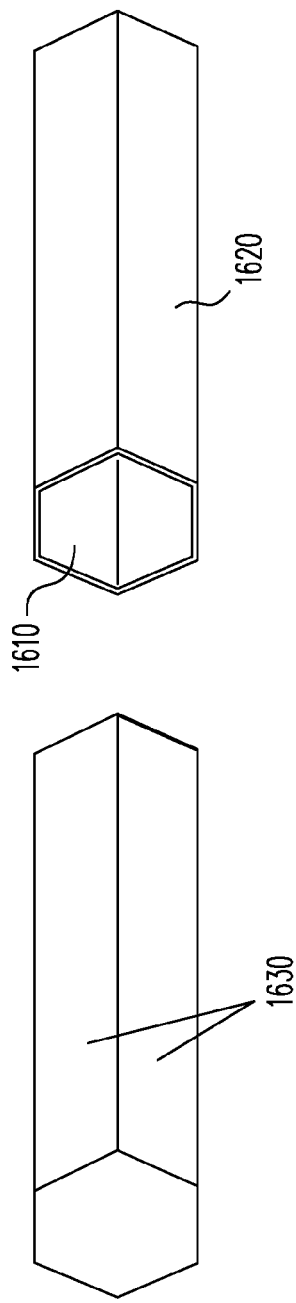
FIGS. 16 and 17 illustrate a polygonal tube that may be utilized in the THCA of FIG. 11, in accordance with one or more embodiments of the present disclosure.

FIG. 16 illustrates a polygonal tube (e.g., a hexagonal tube) that may be utilized in each leg 1104, 1112, 1116, 1120 of the body 1102 of the THCA 1100), in accordance with one or more embodiments of the present disclosure. In one implementation, to achieve sufficient conversion versus overall output efficiency, the ratio of width to length of each leg 1104, 1112, 1116, 1120 should be 1:6. In various other embodiments, the interior surface 1103 of each leg 1104, 1112, 1116, 1120 comprises a highly reflective interior surface 1610 (e.g., silver, gold), an exterior surface 1620 comprising nickel (Ni) of approximately 0.002 inches in thickness, and an exterior surface (i.e., sides only 1630) having a first coating of a highly reflective material (e.g., silver, gold) and then a second coating of nickel (Ni).

In various implementations, referring to FIG. 16, the hollow hex shaped tube is adapted for conversion of the input Gaussian beam to a Top Hat, Homogenous output beam. This occurs due to reflection of the beam off of the highly reflective sides of the hexagonal tube. The tube may be formed by an electro-forming method, wherein electro-forming comprises the process of fabricating apart from plating. For example, a shaped mandrel is plated long enough to build up a "stand alone" thickness. The mandrel is then removed by melting, chemically etching, or exploiting differences in thermal coefficients of expansion between the electro-formed part and the mandrel. In one aspect, an aluminum 'Hex' mandrel may be coated with silver and then with nickel (Ni). The mandrel may then be chemically melted away, which leaves a nickel hexagonal tube with a high reflective silver interior surface.

Figure 17:
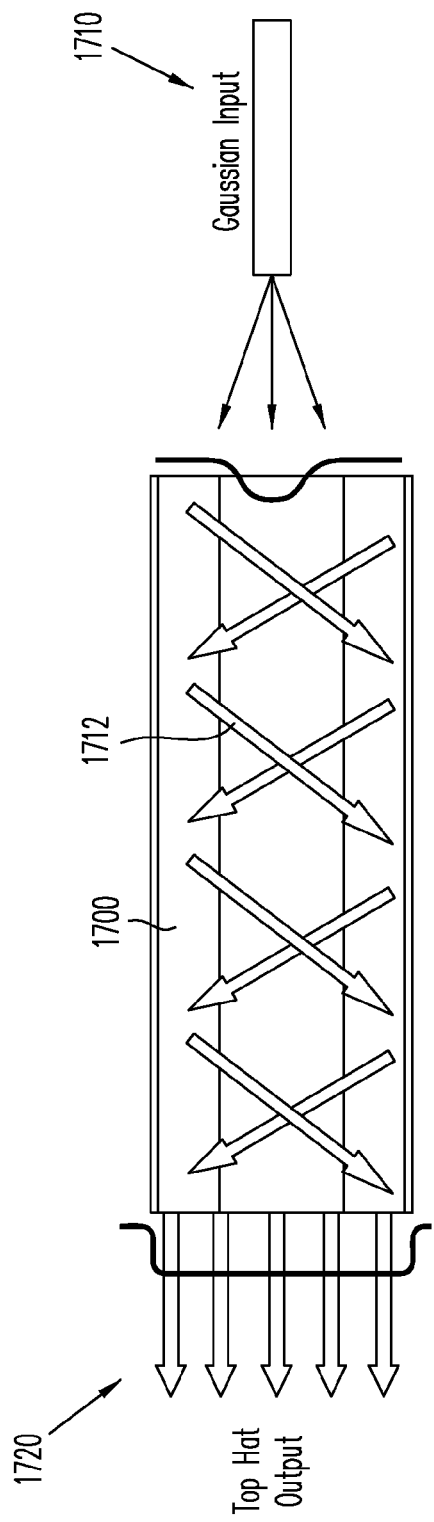

FIG. 17 illustrates a cross-sectional view of a polygonal tube 1700 (e.g., a hexagonal tube) that may be utilized in each leg 1104, 1112, 1116, 1120 of the body 1102 of the THCA 1100, in accordance with one or more embodiments of the present disclosure. As previously described, each leg 1104, 1112, 1116 and 1120 may comprise a polygonal cross-section (e.g., a hexagonal cross-section) and have highly reflective interior surfaces. In one implementation, in reference to FIG. 16, a Gaussian input beam 1710 may be received by the tube 1700 and a Top Hat output 1720 may be provided by the tube 1700. In one aspect, as the Gaussian input beam 1710 enters the tube 1700, the shape of the beam 1710 may comprise a fan pattern. As shown in FIG. 17, while passing through the tube 1700, the beam 1710 may strike the highly reflective interior surfaces of the tube 1700. As such, as the beam 1710 travels down the length of the tube 1700, the beam 1710 undergoes numerous reflections 1712. In one aspect, each strike of the beam 1710 folds over upon itself, to thereby form a uniform, homogenous top hat profile.

In various embodiments, as previously described, the interior surface of the tube 1700 may be coated with numerous materials depending upon the wavelength of the input light. For visible light, a silver surface may achieve the highest efficiency, while a gold surface may be necessary, if the wavelength is in the infrared (IR) region. In one aspect, the tube 1700 may be shaped with a curved contour, as shown in FIG. 1, without loss in performance.

In accordance with one or more embodiments of the present disclosure, the hexagonal shape transforms a Gaussian profile input beam into a homogeneous, top hat profile output beam, with a cross-sectional uniformity of greater than 97%. In one aspect, the overall efficiency of the THCA 1100 is at least 96.5% or greater. As such, the hexagonal shape of the tube 1700 may be manufactured into curved devices, including the THCA 1100.

FIGS. 18A and 18B show various views of a plurality of multi-color curved tri-light generating apparatuses (e.g., THCAs 1100) arranged to form interlocking array patterns 1800, 1850, in accordance with one or more embodiments of the present disclosure. In one aspect, a single light source may feed the legs of three different units (e.g., THCAs 1100). In various implementations, when arranged in the array patterns 1800, 1850, the units (e.g., THCAs 1100) may be utilized as a display device.

Referring to FIGS. 18A and 18B, three different light sources may be inputted into each unit (e.g., THCAs 1100) with one source per leg. The curved input legs of multi-color curved tri-light generating apparatus merge into a single output leg. The three individual, distinct colors, wavelengths may be combined to form a new, single colored output beam. In various implementations, a number of these units (e.g., THCAs 1100) may be banked together in any shape to form signs and displays that have a high output intensity. The overall dimension of each unit (e.g., THCAs 1100) is small, and standard production practices may allow the units to be made with a volume of approximately 0.50 cubic cm. As such, in some instances, this allows for a dense packing of the units (e.g., THCAs 1100).

As shown in FIGS. 18A and 18B, numerous multi-color curved tri-light generating apparatuses (e.g., THCAs 1100) may be banked together, with each leg receiving a single color, as designated by blue (B), red (R), and/or green (G). For example, in various implementations, a single light source may be utilized to illuminate the input legs of three separate multi-color curved tri-light generating apparatuses (e.g., THCAs 1100). Switching the input light sources on or off in conjunction with the light sources of the other two legs, each multi-color curved tri-light generating apparatus (e.g., THCA 1100) may display a colored message and/or sign. As such, banking a plurality of multi-color curved tri-light generating apparatuses (e.g., THCAs 1100) form a high intensity, high resolution display.

Figure 19:
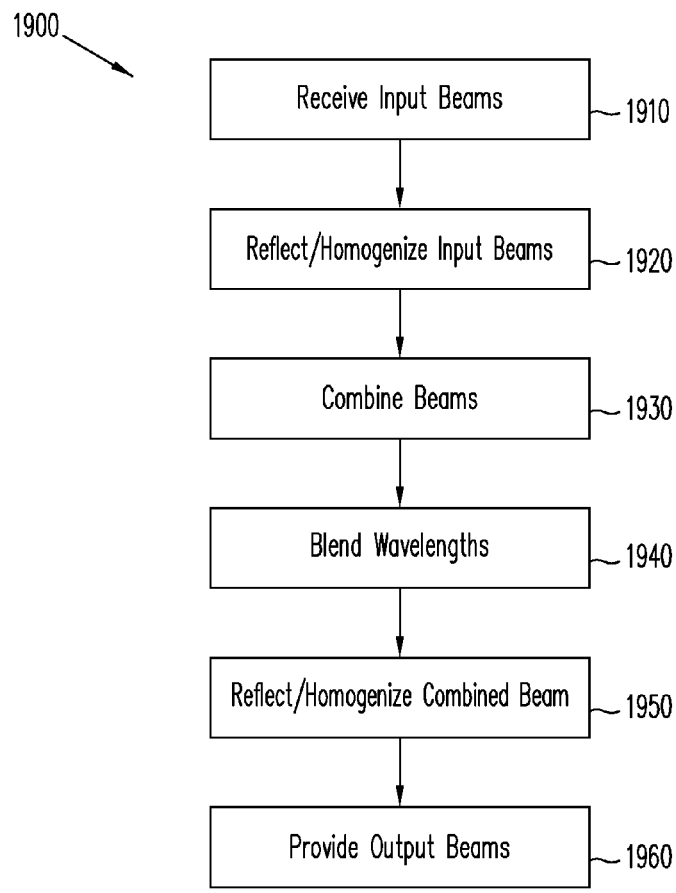
FIG. 19 illustrates a method of homogenizing and combining light beams in a multi-color curved tri-light generating apparatus (e.g., THCA of FIG. 11), in accordance with one or more embodiments of the present disclosure.

FIG. 19 illustrates a method 1900 of homogenizing and combining light beams in a multi-color curved tri-light generating apparatus (e.g., THCA 1100), in accordance with one or more embodiments of the present disclosure. In one implementation, a plurality of input light beams are received (block 1910). For example, in reference to FIGS. 11 and 12, input light beams 1110, 1118, 1119 are received 1910, 1912, 1914 in first, second, and third input legs 1104, 1112, 1116, respectively. In various aspects, the input light beams 1110, 1118, 1119 may have Gaussian intensity profiles, and the input light beams 1110, 1118, 1119 may be emitted from light sources 1510, 1511, 1511 (e.g., fiber optic cables) and be applied to input openings 1106, 1114, 1117, respectively.

Next, the plurality of received input light beams are reflected and/or homogenized (block 1920). For example, the input light beams 1110, 1118, 1119 may be reflected within the legs 1104, 1112, 1116 to produce first, second, and third output beams 1110', 1118', 1119'. In one aspect, the Gaussian input light beams may be reshaped into at least partially homogenized top hat profile beams after repeated reflections from the inside surfaces of the body 1102 of the THCA 1100. In another aspect, the first, second, and third output beams 1110', 1118', 1119' may be homogenized (e.g., completely homogenized) in the first, second, and third legs 1104, 1112, 1116. Next, the plurality of reflected and/or homogenized light beams are combined (block 1930). For example, the at least partially homogenized beams 1110', 1118', 1119' may be combined in the output leg 1120 of the body 1102 of the THCA 1100.

Next, in one implementation, when the input light beams 1110, 1118, 1119 have different wavelengths, the combined beams may be blended (block 1940) so that the output beam 1126 has a new color that is a combination of the wavelengths present in the input beams 1110, 1118, 1119. Next, the combined beam may be reflected and/or homogenized (block 1950), and the reflected and/or homogenized combined light beam is then provided as an output beam (block 1960). For example, the combined beam may be reflected and/or homogenized within the output leg 1120 to produce a combined homogenized output beam 1126 at the output opening 1124 of the body 1102 of the THCA 1100 (block 1960). In one aspect, the combined homogenized output beam 1126 may have a top hat profile and amplitude that is nearly the sum of the amplitudes of the input light beams 1110, 1118, 1119. In another aspect, the output beam may comprise a single output beam and may be provided as an optical output for display.

The one or more embodiments described above illustrate without limiting the present disclosure. It should be understood that numerous modifications and variations are possible in accordance with the principles of the present disclosure. Accordingly, the scope of the present disclosure is defined only by the following claims.

We claim:

1. An apparatus for combining a plurality of light beams, the apparatus comprising:
    a first input component adapted to receive a first input light beam;
    a second input component adapted to receive a second input light beam;
    a third input component adapted to receive a third input light beam; and
    an output component adapted to provide an output light beam,
    wherein the input components and the output component are joined together to combine the input light beams and form the output light beam,
    wherein the input components and the output component have a polygonal-shaped cross-section,
    wherein the first and second input components are joined together at a first junction corresponding to a first side of the output component,
    wherein the first and third input components are joined together at a second junction corresponding to a second side of the output component, and
    wherein the second and third input components are joined together at a third junction corresponding to a third side of the output component.

2. The apparatus of claim 1, wherein each of the input components and the output component comprise a hollow tube with the polygonal-shaped cross-section, and wherein the first input light beam comprises a wavelength for a first color, and wherein the second input light beam comprises a wavelength for a second color, and wherein the third input light beam comprises a wavelength for a third color.

3. The apparatus of claim 1, wherein each of the input components and the output component comprise a hollow tube with the polygonal-shaped cross-section, and wherein the first input light beam comprises a wavelength for the color red, and wherein the second input light beam comprises a wavelength for the color blue, and wherein the third input light beam comprises the wavelength for the color green.

4. The apparatus of claim 3, wherein the polygonal-shaped cross-section comprises a hexagonal-shaped cross-section, and wherein the input components and the output component are joined together to combine the input light beams having wavelengths corresponding to red-green-blue (RGB), respectively, and form the output light beam having another wavelength that is a combination of the RGB wavelengths of the input light beams.

5. The apparatus of claim 1, wherein each of the input components and the output component comprise reflective interior surfaces, and wherein the reflective interior surfaces comprises at least one of nickel, silver and gold.

6. The apparatus of claim 5, wherein the reflective interior surfaces are adapted to reflect the input light beams to homogenize the input light beams into a single output light beam.

7. The apparatus of claim 1, wherein each of the input components and the output component comprise an exterior coating of nickel.

8. The apparatus of claim 1, wherein a side of the first input component is joined to a fourth side of the output component to share a first common surface, and wherein a side of the second input component is joined to a fifth side of the output component to share a second common surface, and wherein a side of the third input component is joined to a sixth side of the output component to share a third common surface.

9. The apparatus of claim 1, wherein each of the input components and the output component are joined together to form a one-piece body, and wherein the one-piece body comprises a structure with a plurality of curved tubular legs corresponding to the first, second, and third input components, and wherein each of the legs are joined at a junction with the output component comprising an output leg extending from the junction.

10. The apparatus of claim 1, wherein each of the input components comprise a ratio of width to length of 1:6.

11. A method for combining a plurality of light beams, the method comprising:
    forming a one-piece light reflecting body having first, second, and third polygonal-shaped input components and a polygonal-shaped output component;
    receiving a first input light beam having a first wavelength at the first input component;
    receiving a second input light beam having a second wavelength at the second input component;
    receiving a third input light beam having a third wavelength at the third input component;
    reflecting each of the input light beams; and
    combining the input light beams into a single output light beam having a fourth wavelength that is a combination of the wavelengths of the input light beams,
    wherein forming the one-piece light reflecting body comprises:
        joining the first input component to the second input component at a first junction corresponding to a first side of the output component,
        joining the first input component to the third input component at a second junction corresponding to a second side of the output component, and
        joining the second input component to the third input component at a third junction corresponding to a third side of the output component.

12. The method of claim 11, wherein reflecting each of the input light beams comprises homogenizing each of the input light beams.

13. The method of claim 11, further comprising blending the first, second and third wavelengths into the fourth wavelength.

14. The method of claim 11, further comprising providing the single output light beam as an optical output to the output component.

15. The method of claim 11, wherein the first wavelength comprises a wavelength for a first color, and wherein the second wavelength comprises a wavelength for a second color, and wherein the third wavelength comprises a wavelength for a third color.

16. The method of claim 11, wherein the first wavelength comprises the wavelength for the color red, and wherein the second wavelength comprises the wavelength for the color blue, and wherein the third wavelength comprises the wavelength for the color green.

17. An apparatus for combining a plurality of light beams, the apparatus comprising:
- a first curved, polygonal-shaped input leg having a first input opening;
- a second curved, polygonal-shaped input leg having a second input opening;
- a third curved, polygonal-shaped input leg having a third input opening; and
- a polygonal-shaped output leg having an output opening;
- wherein the first, second, and third input legs are joined to the output leg to form a one-piece body,
- wherein a first input light beam received at the first input opening, a second input light beam received at the second input opening, and a third input light beam received at the third input opening are combined to form an output light beam for emission from the output opening,
- wherein the first and second input legs are joined together at a first junction corresponding to a first side of the output leg,
- wherein the first and third input legs are joined together at a second junction corresponding to a second side of the output leg, and
- wherein the second and third input legs are joined together at a third junction corresponding to a third side of the output leg.

18. The apparatus of claim 17, wherein each of the polygonal-shaped input legs and the polygonal-shaped output leg comprise a hollow, hexagonal-shaped tubular structure.

19. The apparatus of claim 17, wherein each of the input legs and the output leg comprise reflective interior surfaces, and wherein the reflective interior surfaces comprises at least one of nickel, silver and gold.

20. The apparatus of claim 19, wherein the reflective interior surfaces are adapted to reflect the input light beams to homogenize the input light beams into a single output light beam.

21. The apparatus of claim 17, wherein each of the input legs and the output leg comprise an exterior coating of nickel.

22. The apparatus of claim 17, wherein each of the curved, polygonal-shaped legs comprise a ratio of width to length of 1:6.

23. The apparatus of claim 17, wherein the first, second, and third input beams correspond to first, second, and third colors, respectively, and wherein the output light beam comprises a single output light beam of a fourth color that is different from the first, second, and third colors.

24. The apparatus of claim 17, wherein the first input beam corresponds to a first color comprising the color red, the second input beam corresponds to a second color comprising the color blue, and the third input beam corresponds to a third color comprising the color green, and wherein the output light beam comprises a single output light beam of a combined color that is a combination of the red, blue, and green colors.

25. The apparatus of claim 17, wherein a side of the first input leg is joined to a fourth side of the output leg to share a first common surface, and wherein a side of the second input leg is joined to a fifth side of the output leg to share a second common surface, and wherein a side of the third input leg is joined to a sixth side of the output leg to share a third common surface.

* * * * *